US012656064B2

(12) United States Patent
Ji

(10) Patent No.: US 12,656,064 B2
(45) Date of Patent: Jun. 16, 2026

(54) POWER GENERATION SYSTEM

(71) Applicant: Samsung Electronics Co., Ltd., Suwon-si (KR)

(72) Inventor: Soo-Young Ji, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/950,506

(22) Filed: Nov. 18, 2024

(65) Prior Publication Data

US 2025/0377164 A1 Dec. 11, 2025

(30) Foreign Application Priority Data

Jun. 5, 2024 (KR) ........................ 10-2024-0073759

(51) Int. Cl.
*F28C 3/00* (2006.01)
*F01D 15/10* (2006.01)
*F03B 13/10* (2006.01)

(52) U.S. Cl.
CPC .............. *F28C 3/005* (2013.01); *F01D 15/10* (2013.01); *F03B 13/10* (2013.01)

(58) Field of Classification Search
CPC .......... F28C 3/005; F01D 15/10; F03B 13/10; H05K 7/20236; H05K 7/20272; F01K 25/08; F28D 2015/0291
USPC ........................ 165/104.29; 290/54; 361/700
See application file for complete search history.

(56) References Cited

U.S. PATENT DOCUMENTS 6,550,263 B2 4/2003 Patel et al.
7,403,393 B2 * 7/2008 Herring ............... H01L 23/4332 257/E23.091
8,850,816 B2 * 10/2014 North ........................ G06F 1/20 60/671
9,195,282 B2 11/2015 Shelnutt et al.
9,752,832 B2 * 9/2017 Kare ....................... F28D 15/04
9,907,213 B1 * 2/2018 Gravina .................. F01D 15/10
10,069,442 B2 9/2018 Chin et al.
10,257,963 B2 * 4/2019 Ozyalcin ............ H05K 7/20236
10,674,641 B2 * 6/2020 Shepard ................. H05K 7/203
(Continued)

FOREIGN PATENT DOCUMENTS

CN 107041098 B 4/2019
CN 109372590 B 2/2022
(Continued)

*Primary Examiner* — J. T. Newton
(74) *Attorney, Agent, or Firm* — Fish & Richardson P.C.

(57) ABSTRACT

A power generation system may be used to cool a heat dissipation device based on immersion in a refrigerant such that bubbles are generated at a heat dissipation device surface of the heat dissipation device in the refrigerant. The power generation system includes a turbine, a connector, and a converter. The turbine includes a turbine shaft and turbine blades connected thereto. The connector connects the turbine and the heat dissipation device to position the turbine shaft to extend parallel to gravity and position the turbine in the refrigerant above at least a portion of the heat dissipation device surface in a vertical direction, to configure the turbine to rotate based on an action of rising pressure exerted by the bubbles rising from the heat dissipation device surface to impinge on the turbine blades. The converter is configured to convert kinetic energy of the turbine into electrical energy.

8 Claims, 13 Drawing Sheets

(56) References Cited

U.S. PATENT DOCUMENTS

| | | | | |
|---|---|---|---|---|
| 2009/0242174 | A1* | 10/2009 | McCutchen | F01K 25/08 165/104.25 |
| 2010/0102567 | A1* | 4/2010 | Nash | F03B 17/02 290/54 |
| 2011/0232875 | A1* | 9/2011 | McCutchen | F28D 15/0266 165/104.22 |
| 2015/0373882 | A1* | 12/2015 | Smith | H05K 7/20809 361/679.46 |
| 2017/0222575 | A1* | 8/2017 | Chin | H02N 11/002 |
| 2018/0231029 | A1* | 8/2018 | Cherry | F04D 17/10 |
| 2023/0380102 | A1* | 11/2023 | Ahuja | H05K 7/20272 |
| 2024/0015928 | A1 | 1/2024 | Jian | |

FOREIGN PATENT DOCUMENTS

| | | | |
|---|---|---|---|
| CN | 114679901 | A | 6/2022 |
| CN | 116744636 | A | 9/2023 |
| CN | 116744658 | A | 9/2023 |

* cited by examiner

POWER GENERATION SYSTEM

CROSS-REFERENCE TO RELATED APPLICATION

This application claims priority to and the benefit of Korean Patent Application No. 10-2024-0073759 filed in the Korean Intellectual Property Office on Jun. 5, 2024, the entire contents of which are incorporated herein by reference.

BACKGROUND

(a) Field

The present inventive concepts relate to power generation systems.

(b) Description of the Related Art

Immersion cooling is a technology that cools one or more devices (e.g., electronic products, batteries, servers, etc.) based on immersing the one or more devices in a non-conductive liquid (insulating fluid). The insulating fluid may not conduct electricity (e.g., may be nonconductive).

Immersion cooling may include directly absorbing heat dissipated from a device using a liquid with a higher density than air. Immersion cooling may have an advantage of not conducting electricity, so there is no risk (or a reduced or minimized risk) of electric leakage or mechanical failure resulting from the immersion cooling of the device. Recently, immersion cooling technology has been receiving great attention by the action of proliferation of ESS, electric vehicles, and data servers.

In some cases, the use of immersion cooling technology is increasing in products configured to maintain a certain temperature, such products including one or more of batteries and servers. For example, immersion cooling of various electronic devices may not only be used to simply lower the temperature of the electronic devices, but also to maintain a uniform system temperature of various electronic devices.

Immersion cooling methods (processes) may be divided into single-phase methods and two-phase methods depending on the insulating fluid used.

In the case of the single-phase method, the insulating fluid circulates in a liquid state and absorbs heat as it passes through the electrical components, and in this process, there is no separate phase change process.

In the case of the two-phase method, the insulating fluid changes phase into gas based on absorbing heat from a heat dissipation device, and this method utilizes latent heat for phase change.

SUMMARY

Some example embodiments of the present inventive concepts provide a power generation system that is configured to generate electrical energy based on rotating a turbine using rising pressure of bubbles generated during an immersion cooling process of cooling a heat dissipation device. Such example embodiments may further improve the power consumption efficiency of an electronic device that includes the power generation system.

In addition, some example embodiments of the present inventive concepts provide a power generation system in which bubbles rising from a heat dissipation device always rotate blades of a turbine to drive the turbine regardless of a disposition direction (e.g., position and/or orientation in relation to the direction of gravity) of the heat dissipation device by automatically changing a disposition structure (e.g., position and/or orientation in relation to the direction of gravity) of the turbine attached to a heat dissipation device (also referred to herein interchangeably as a heat radiator) according to a direction (e.g., position and/or orientation in relation to the direction of gravity) in which the heat radiator is positioned in a cooler (also referred to herein interchangeably as an immersion cooler).

Some example embodiments provide a power generation system configured to be used in a cooling process to cool a heat dissipation device based on immersing the heat dissipation device in a refrigerant such that bubbles are generated at a heat dissipation device surface of the heat dissipation device in the refrigerant. The power generation system may include a turbine, a connector, and a converter. The turbine may include a turbine shaft and a plurality of turbine blades connected to the turbine shaft. The connector may be configured to connect the turbine and the heat dissipation device to position the turbine shaft to extend parallel to a direction of gravity and to position the turbine in the refrigerant above at least a portion of the heat dissipation device surface in a vertical direction extending parallel and opposite to the direction of gravity, to configure the turbine to rotate based on an action of rising pressure exerted by the bubbles, based on the bubbles rising at least partially in the vertical direction from the heat dissipation device surface to impinge on the plurality of turbine blades. The converter may be configured to convert kinetic energy of the turbine into electrical energy.

Some example embodiments provide a power generation system configured to be used in a process of cooling a heat dissipation device based on immersing the heat dissipation device in a refrigerant such that bubbles are generated at a heat dissipation device surface of the heat dissipation device in the refrigerant. The power generation system may include a turbine and a connector. The turbine may include a turbine shaft and a plurality of turbine blades connected to the turbine shaft. The connector may be configured to connect the turbine and the heat dissipation device to position the turbine shaft to extend parallel to a direction of gravity and to position the turbine in the refrigerant above at least a portion of the heat dissipation device surface in a vertical direction extending parallel and opposite to the direction of gravity, to configure the turbine to rotate based on an action of rising pressure exerted by the bubbles, based on the bubbles rising at least partially in the vertical direction from the heat dissipation device surface to impinge on the plurality of turbine blades. The connector may include a first connector having a first side connected to the turbine, a second connector configured to fix the first connector to the heat dissipation device, and a first rotator between the first connector and the second connector. The first rotator may be configured to rotate at least partially around a first rotation axis of the first rotator, the first rotation axis perpendicular to a central longitudinal axis of the turbine shaft.

Some example embodiments provide a power generation system configured to be used in a cooling process of immersion cooling a heat dissipation device in a refrigerant. The power generation system may include a turbine, a connector, and a converter. The turbine may include a turbine shaft and a plurality of turbine blades connected to the turbine shaft. The turbine may be in the refrigerant above at least a portion of a heat dissipation device surface of the heat dissipation device in a vertical direction extending parallel and opposite to a direction of gravity, such that the turbine is configured to rotate based on an action of rising pressure of exerted by bubbles generated at the heat dissipation device surface and rising at least partially in the vertical direction from the heat dissipation device surface to impinge on the plurality of turbine blades. The connector may be configured to connect the turbine and the heat dissipation device, and to position the turbine shaft to extend parallel to the direction of gravity. The converter may be configured to convert a kinetic energy of the turbine into electrical energy.

According to some example embodiments of the inventive concepts, energy utilization efficiency (e.g., power consumption efficiency) of an electronic device that includes the heat dissipating device and the power generation system may be increased based on generating electrical energy using bubbles generated during a cooling process (e.g., immersion cooling) of the heat dissipating device.

DETAILED DESCRIPTION

Figure 1:
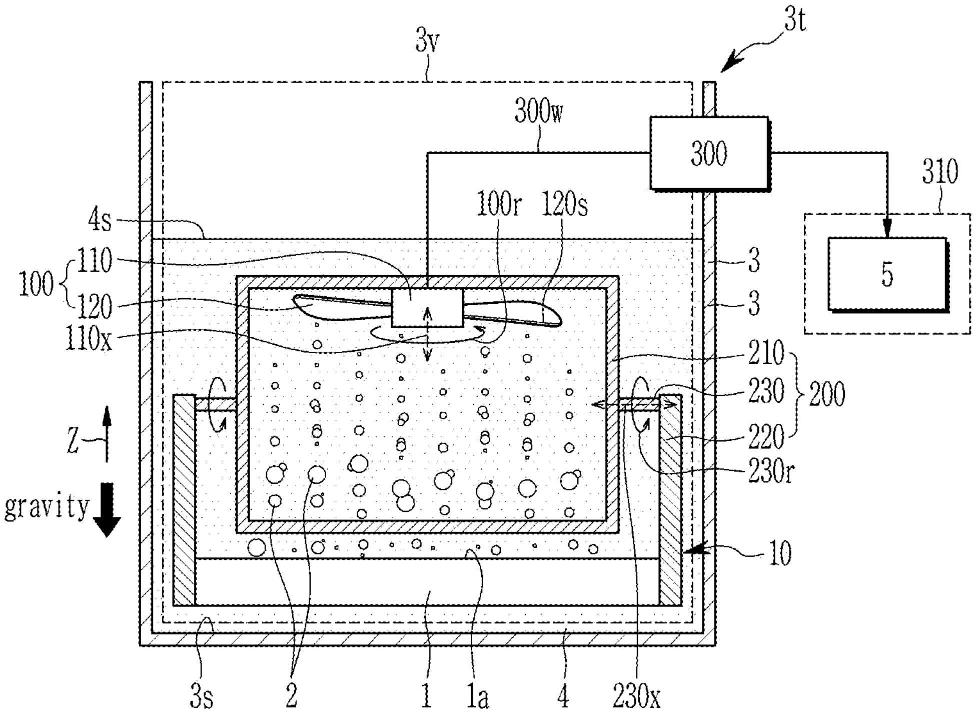
FIG. 1 illustrates a power generation system according to some example embodiments of the present inventive concepts.

The present inventive concepts will be described more fully hereinafter with reference to the accompanying drawings, in which some example embodiments of the inventive concepts are shown. As those skilled in the art would realize, the described example embodiments may be modified in various different ways, all without departing from the spirit or scope of the present inventive concepts.

To clearly describe the present inventive concepts, parts that are irrelevant to the description in the drawings are omitted, and like numerals refer to like or similar constituent elements throughout the specification.

Further, since sizes and thicknesses of constituent members shown in the accompanying drawings are arbitrarily given for better understanding and ease of description, the present inventive concepts are not limited to the illustrated sizes and thicknesses. In the drawings, the thicknesses of layers, films, panels, regions, etc., are exaggerated for clarity. In the drawings, for better understanding and ease of description, the thicknesses of some layers and areas are exaggerated.

Throughout this specification and the claims that follow, when it is described that an element is "coupled/connected" to another element, the element may be "directly coupled/connected" to the other element or "indirectly coupled/connected" to the other element through a third element. In addition, unless explicitly described to the contrary, the word "comprise" and variations such as "comprises" or "comprising" will be understood to imply the inclusion of stated elements but not the exclusion of any other elements.

It will be understood that when an element such as a layer, film, region, plate, etc. is referred to as being "on" another element, it can be directly on the other element or intervening elements may also be present. In contrast, when an element is referred to as being "directly on" another element, there are no intervening elements present. Further, in the specification, the word "on" or "above" means positioned on or below the object portion and does not necessarily mean positioned on the upper side of the object portion based on a gravitational direction.

Further, throughout the specification, the phrase "in a plan view" means when an object portion is viewed from above, and the phrase "in a cross-sectional view" means when a cross-section taken by vertically cutting an object portion is viewed from the side.

It will be understood that elements and/or properties thereof (e.g., structures, surfaces, directions, or the like), which may be referred to as being "perpendicular," "parallel," "coplanar," or the like with regard to other elements and/or properties thereof (e.g., structures, surfaces, directions, or the like) may be "perpendicular," "parallel," "coplanar," or the like or may be "substantially perpendicular," "substantially parallel," "substantially coplanar," respectively, with regard to the other elements and/or properties thereof.

Elements and/or properties thereof (e.g., structures, surfaces, directions, or the like) that are "substantially perpendicular", "substantially parallel", or "substantially coplanar" with regard to other elements and/or properties thereof will be understood to be "perpendicular", "parallel", or "coplanar", respectively, with regard to the other elements and/or properties thereof within manufacturing tolerances and/or material tolerances and/or have a deviation in magnitude and/or angle from "perpendicular", "parallel", or "coplanar", respectively, with regard to the other elements and/or properties thereof that is equal to or less than 10% (e.g., a. tolerance of ±10%).

It will be understood that elements and/or properties thereof may be recited herein as being "identical", "the same", or "equal" as other elements and/or properties thereof, and it will be further understood that elements and/or properties thereof recited herein as being "identical" to, "the same" as, or "equal" to other elements and/or properties thereof may be "identical" to, "the same" as, or "equal" to or "substantially identical" to, "substantially the same" as or "substantially equal" to the other elements and/or properties thereof. Elements and/or properties thereof that are "substantially identical" to, "substantially the same" as or "substantially equal" to other elements and/or properties thereof will be understood to include elements and/or properties thereof that are identical to, the same as, or equal to the other elements and/or properties thereof within manufacturing tolerances and/or material tolerances. Elements and/or properties thereof that are identical or substantially identical to, equal to or substantially equal to, and/or the same or substantially the same as other elements and/or properties thereof may be structurally the same or substantially the same, functionally the same or substantially the same, and/or compositionally the same or substantially the same. While the term "same," "equal" or "identical" may be used in description of some example embodiments, it should be understood that some imprecisions may exist. Thus, when one element or property is referred to as being identical to, equal to, or the same as another element or property, it should be understood that the element or property is the same as another element or property within a desired manufacturing or operational tolerance range (e.g., ±10%).

It will be understood that elements and/or properties thereof described herein as being "substantially" the same, equal, and/or identical encompasses elements and/or properties thereof that have a relative difference in magnitude that is equal to or less than 10%. Further, regardless of whether elements and/or properties thereof are modified as "substantially," it will be understood that these elements and/or properties thereof should be construed as including a manufacturing or operational tolerance (e.g., ±10%) around the stated elements and/or properties thereof.

When the terms "about" or "substantially" are used in this specification in connection with a numerical value, it is intended that the associated numerical value includes a manufacturing or operational tolerance (e.g., ±10%) around the stated numerical value. Moreover, when the words "about" and "substantially" are used in connection with geometric shapes, it is intended that precision of the geometric shape is not required but that latitude for the shape is within the scope of the disclosure. Further, regardless of whether numerical values or shapes are modified as "about" or "substantially," it will be understood that these values and shapes should be construed as including a manufacturing or operational tolerance (e.g., ±10%) around the stated numerical values or shapes. When ranges are specified, the range includes all values therebetween such as increments of 0.1%.

As described herein, when an operation is described to be performed, or an effect such as a structure is described to be established "by" or "through" performing additional operations, it will be understood that the operation may be performed and/or the effect/structure may be established "based on" the additional operations, which may include performing said additional operations alone or in combination with other further additional operations.

Hereinafter, a power generation system 10 according to some example embodiments of the present inventive concepts will be described in more detail with reference to the drawings.

Figure 2:
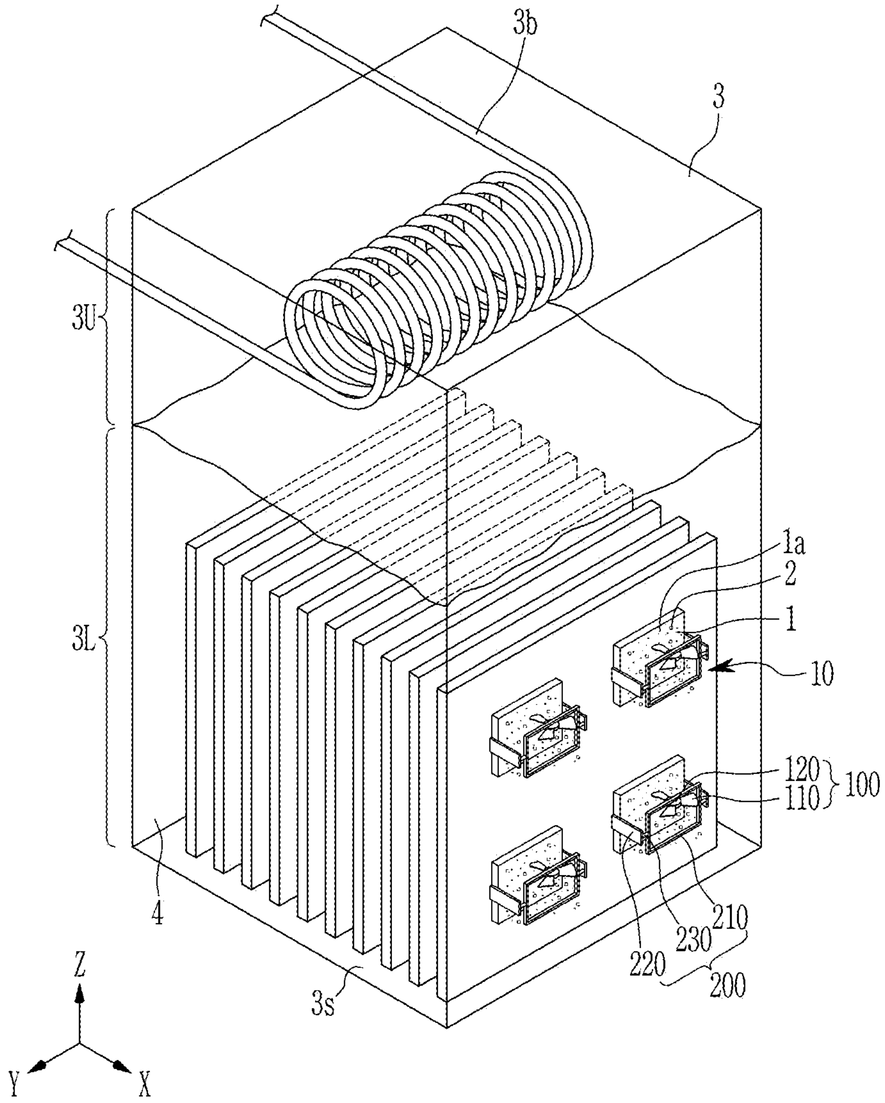
FIG. 2 illustrates a power generation system according to some example embodiments of the present inventive concepts.

FIG. 1 and FIG. 2 illustrate the power generation system 10 according to some example embodiments of the present inventive concepts.

First, FIG. 1 illustrates a power generation system 10 according to some example embodiments, showing a heat dissipation device 1 being cooled while immersed in a refrigerant 4 contained within an immersion cooler 3, and the power generation system 10 connected to the heat dissipation device 1.

As shown in FIG. 1, a method of performing cooling by arranging the heat dissipation device 1 to be submerged in the refrigerant 4 is called immersion cooling.

The refrigerant 4 used herein corresponds to a fluid that does not conduct electricity and has a high heat transfer rate and low thermal resistance. The refrigerant may be referred to herein as an insulating fluid. The refrigerant 4 may include one or more hydrofluorocarbons, ethers, hydrocarbons, silicone oils, water glycols, etc.

As shown in FIG. 1 and further shown in FIG. 2, the immersion cooler 3 may include a container 3*a* (which may be open-topped as shown, although example embodiments are not limited thereto) defining an internal space 3*v* (which in some example embodiments may be entirely enclosed) which may be configured to hold liquid refrigerant 4 in at least a lower region 3L of the immersion cooler 3 and may further include a condenser coil 3*b* located at least at an upper region 3U of the immersion cooler 3. The immersion cooler 3 may be configured to perform a cooling process to cool the heat dissipation device 1, which may include for example a heat radiator surface of an electronic device. The upper region 3U may be defined as a region of the internal space 3*v* of the immersion cooler 3 in which a condenser coil 3*b* is located, and the lower region 3L may be a region configured to be filled with liquid refrigerant 4 (e.g., at or below liquid surface 4*s*) and in which the heat dissipation device 1 and the power generation system 10 are located.

The immersion cooler 3 may be configured to perform a cooling process wherein heat may be removed from the heat dissipation device 1 and absorbed by liquid refrigerant 4 at a heat dissipation device surface 1*a* (also referred to herein interchangeably as a heat radiator surface, a heat transfer surface, heat dissipation surface or the like) of the heat dissipation device 1. At least a portion of such liquid refrigerant 4 at the heat dissipation device surface 1*a* may vaporize based on absorbing heat from the heat dissipation device surface 1*a*, thereby generating bubbles 2 of vaporized refrigerant at the heat dissipation device surface 1*a*. The bubbles 2 of vaporized refrigerant (also referred to herein as simply bubbles) may then rise upward through the liquid refrigerant 4, in a vertical direction Z that extends parallel and opposite to the direction of gravity, to the upper region 3U of the immersion cooler 3 above a liquid surface 4*s* of the liquid refrigerant 4. The vaporized refrigerant in the upper region 3U may be in thermal communication with the condenser coil 3*b* and may transfer the absorbed heat to the condenser coil 3*b* to remove said heat from the immersion cooler 3. The vaporized refrigerant may condense back into liquid refrigerant 4 based on transferring heat to the condenser coil 3*b*. The condensed refrigerant 4 may fall back into the mass of liquid refrigerant 4 in the lower region 3L of the immersion cooler 3 under the influence of gravity. The condenser coil 3*b* may be configured to cool vaporized refrigerant (e.g., refrigerant gas) to condense back into liquid refrigerant 4, for example based on circulating a separate coolant through an interior of the condenser coil 3*b* to absorb heat from the vapor refrigerant to cause the vapor refrigerant to condense, for example to condense on an outer surface of the condenser coil 3*b*. In some example embodiments, the condenser coil 3*b* is part of a heat sink configured to discharge heat to an ambient environment external to the immersion cooler 3 via conduction, convection, radiation, or any combination thereof.

FIG. 1 illustrates an internal side cross-section of the immersion cooler 3 according to some example embodiments to describe positions of the heat dissipation device 1 and the power generation system 10 in the immersion cooler 3 and/or in relation to each other.

As shown, the heat dissipation device 1 may be positioned at a lower portion (e.g., lower region 3L) inside the immersion cooler 3, for example to be at and/or proximate to a bottom surface of the cooler container 3*a* which may at least partially define a bottom end 3*s* of the immersion cooler 3, and the power generation system 10 may be installed at an upper portion of the heat dissipation device 1 (e.g., at and/or at least partially above the heat dissipation device 1 in the vertical direction Z within the immersion cooler 3) and connected to the heat dissipation device 1. As shown, an opposite end of the immersion cooler 3 in the vertical direction Z in relation to the bottom end 3*s* may be a top end 3*t* of the immersion cooler 3, and which may be defined by a top end of the container 3*a*.

The power generation system 10 according to some example embodiments of the present inventive concepts is a power generation system 10 that uses bubbles 2 generated in a process of cooling the heat dissipation device 1 by immersing the heat dissipation device 1 in the refrigerant 4. For example, the power generation system 10 may be configured to be used in a cooling process performed by the immersion cooler 3 to cool the heat dissipation device 1 based on immersing the heat dissipation device 1 in the refrigerant 4 (e.g., liquid refrigerant) such that bubbles 2 (e.g., bubbles of vaporized refrigerant) are generated at a heat dissipation device surface 1*a* of the heat dissipation device 1 in the refrigerant 4. The refrigerant 4 may be interchangeably referred to as liquid refrigerant.

First, the power generation system 10 may include a turbine 100 including a turbine shaft 110 and a blade portion 120 connected to the turbine shaft 110, a connector 200 connecting the turbine 100 and the heat dissipation device 1, and a converter 300 (e.g., an electrical generator) that converts kinetic energy of the turbine 100 into electrical energy. The connector 200 may connect the turbine 100 and the heat dissipation device 1 to each other such that the turbine shaft 110 (e.g., the central longitudinal axis 110*x* thereof) is positioned (e.g., positioned by the connector 200) parallel to a direction of gravity (e.g., parallel to the vertical direction Z extending parallel and opposite to the direction of gravity).

The turbine 100 may include a turbine shaft 110 and a blade-shaped blade portion 120 formed to extend with the turbine shaft 110 at a center (e.g., such that the central longitudinal axis of the turbine shaft 110 is an axis of rotation of the turbine 100). The blade portion 120 may include a plurality of turbine blades coupled to a blade hub that is coupled to or defined by the turbine shaft 110. In some example embodiments, the blade portion 120 includes a plurality of turbine blades that are each separately connected (e.g., directly connected, fixed, and/or integrated as separate portions of a single unitary piece of material) to the turbine shaft 110. The blade portion 120 may be referred to herein interchangeably as a plurality of turbine blades.

The blade portion 120 may be configured to rotate around the central longitudinal axis 110*x* of the turbine shaft 110, such that the central longitudinal axis 110*x* may be an axis of rotation of the plurality of turbine blades of the blade portion 120 and thus may be an axis of rotation of the turbine 100. It will be understood that the rotation 100*r* of the turbine 100 may include rotation of the turbine shaft 110 around the central longitudinal axis 110*x* due to rotation of the blade portion 120, for example based on the blade portion 120 (e.g., the plurality of turbine blades) being fixed to the turbine shaft 110. The turbine 100 may include or may be connected 300*w* (directly or indirectly) to an electrical generator (e.g., converter 300) that is configured to generate electrical power based on the turbine 100 rotating 100*r* (e.g., based on the kinetic energy of the turbine 100). The connection 300*w* may be a mechanical connection, for example a direct connection and or integration of the turbine shaft 110 and a driveshaft of an electrical generator of the converter 300, an indirect connection between the turbine shaft 110 and an electrical generator of the converter 300 through a mechanical transmission, or the like.

The turbine 100 positioned within the refrigerant 4 may be positioned (e.g., by the connector 200) in a path along which the bubbles 2 generated during the cooling process of the heat dissipation device 1 move. For example, the connector 200 may position the turbine 100 in the refrigerant 4 within the immersion cooler 3 such that the heat dissipation device 1 is located between the turbine 100 and a bottom end 3*s* of the immersion cooler 3 in the direction of gravity and/or the vertical direction Z. For example, as shown, the connector 200 may position the turbine 100 in the refrigerant 4 above at least a portion of the heat dissipation device surface 1*a* in the vertical direction Z.

The turbine 100 may be positioned above (e.g., in the vertical direction parallel and opposite the direction of gravity) a bubble generation area within the refrigerant 4 where the bubbles 2 are generated in and/or by the heat dissipation device 1. The bubble generation area may be at and/or defined by a heat dissipation surface 1*a* of the heat dissipation device 1. The bubble generation area may be referred to interchangeably as the heat dissipation device surface 1*a* and/or a region at and/or at least partially defined by the heat dissipation device surface 1*a*. Accordingly, the blade portion 120 of the turbine 100 may rotate (e.g., the turbine blades may rotate) by the action of pressure caused by a rise of the bubbles 2 through the refrigerant 4 in the vertical direction Z and impinging on the blade portion 120, including for example impinging upwards on one or more lower surfaces 120*s* of the blade portion 120 that are facing at least partially in the direction of gravity, which may include one or more lower surfaces facing at least partially towards the bottom end 3*s* of the immersion cooler 3, so as to rotate 100*r* the turbine 100. It will be understood that rotation 100*r* of the turbine 100 may be referred to interchangeably as rotation of the blade portion 120 around the central longitudinal axis 110*x*, as rotation of the turbine shaft 110 around the central longitudinal axis 110*x* for example based on the turbine shaft 110 being fixed to a blade hub of the blade portion 120, any combination thereof, or the like. For example, the turbine 100 may rotate based on an action of rising pressure exerted by the bubbles 2, based on the bubbles 2 rising at least partially in the vertical direction Z from the heat dissipation device surface 1*a* to impinge on the plurality of turbine blades of the blade portion 120, for example to impinge and exert rising pressure on one or more lower surfaces 120*s* of the blade portion 120.

Specifically, the fact that the bubbles 2 are generated in and/or by the heat dissipation device 1 indicates that, based on the refrigerant 4 in contact with the heat dissipation device 1 (e.g., at the heat dissipation device surface 1*a*) being vaporized, the bubbles 2 of vaporized refrigerant are generated on the heat dissipation device 1 (e.g., at the heat dissipation device surface 1*a*) by the action of heat from the heat dissipation device 1 immersed in the refrigerant 4.

A position of the turbine 100 may include a position and/or orientation where a certain amount of bubbles 2 are generated below the turbine 100 (e.g., in the direction of gravity). For example, the position of the turbine 100 may include a position within the refrigerant 4 that overlaps, in the vertical direction Z and/or the direction of gravity, a position where at least a threshold amount of bubbles 2 are generated in and/or by the heat generation device 1 at the heat dissipation device surface 1*a*. The certain amount of bubbles 2 generated below the turbine 100 refers to an amount at which the turbine 100 can rotate by the action of the bubbles 2. For example, the certain amount may refer to a minimum threshold amount of bubbles 2 that, upon rising to the position of the turbine 100 in the vertical direction Z, may cause the turbine 100 to rotate 100*r* to generate electrical power (referred to herein interchangeably as electrical energy).

The connector 200 serves (e.g., is configured) to connect the heat dissipation device 1 and the turbine 100, for example to position the turbine 100 in relation to the heat dissipation device 1 in the immersion cooler 3.

The connector 200 may include a first connector 210 (also referred to herein as a first connector member) having a first side (e.g., a first end) that is connected to the turbine 100 to fix the turbine 100 (e.g., fix the turbine 100 in relation to at least the first connector 210), a second connector 220 fixing the first connector 210 to the heat dissipation device 1, and a first rotator 230 positioned between (e.g., connected between) the first connector 210 and the second connector 220.

The first connector 210 may have a quadrangular frame shape (see FIGS. 1 and 2).

The first rotator 230 may be positioned between the first connector 210 and the second connector 220 to rotate 230*r* about a direction that is perpendicular to the turbine shaft 110 (e.g., perpendicular to the central longitudinal axis 110*x* of the turbine shaft 110). Herein, the first connector 210 connected to the first rotator 230 may rotate together with rotation of the first rotator 230. For example, the first rotator 230 may be configured to rotate 230*r* at least partially around a first rotation axis 230*x* of the first rotator 230, and the first rotation axis 230*x* may extend perpendicular or substantially perpendicular to the central longitudinal axis 110*x* of the turbine shaft 110. The first connector 210 may be configured to rotate at least partially around the first rotation axis 230*x* together with rotation 230*r* of the first rotator 230 (e.g., based on the first connector 210 being fixed to the first rotator 230).

As the first connector 210 rotates, the turbine 100 fixed to the first side of the first connector 210 also rotates (e.g., rotates around the first rotation axis 230*x*). A change in position of the turbine 100 according to the rotation of the first connector 210 will be described through FIGS. 3A, 3B, 4A, and 4B, which will be described below.

In the present inventive concepts, the heat dissipation device 1 to be cooled by the immersion cooler 3 may include an electronic device. The electronic device may include solid state drive (SSD).

Particularly, the power generation system 10 according to some example embodiments of the present inventive concepts may further increase efficiency (e.g., increase power consumption efficiency of the heat dissipation device 1, which may include an electronic device) by utilizing a large amount of air bubbles generated in the cooler 3 by positioning the turbine 100 close to a particular heat dissipation device 1 (e.g., a controller of a plurality of SSDs) that generates more heat than other heat dissipation devices 1 (e.g., the heat dissipation device surface 1*a* may be a surface of a controller of a plurality of SSDs and which emits more heat than other surfaces among the plurality of SSDs).

The power generation system 10 may generate electrical power (referred to herein interchangeably as electrical energy) based on recovering energy removed from the heat dissipation device via the refrigerant 4 based on the turbine 100 being caused to rotate 100*r* by the rising bubbles 2 exerting pressure on the blade portion 120 (e.g., one or more lower surfaces 120*s* thereof). As a result, the net power consumption by a system comprising the heat dissipation device 1 (e.g., net power consumption by the heat dissipation device 1 itself, which may include or be included in an electronic device) and/or the operation costs associated with such power consumption may be reduced without compromising operational performance of the heat dissipation device 1 (e.g., computing operations performed by a heat dissipation device 1 that includes an electronic device where heat is generated and is dissipated to the refrigerant based on said computing operations) and/or heat transfer performance (cooling performance) of the immersion cooler 3. As a result, the power generation system 10 may improve the power consumption efficiency of a system that includes the heat dissipation device 1 and/or reduce operation costs associated with power consumption by a system that includes the heat dissipation device 1.

FIG. 2 illustrates the power generation system 10 installed in the heat dissipation device 1, where the heat dissipation device 1 is configured to be cooled using the immersion cooler 3, according to some example embodiments.

FIG. 2 shows the immersion cooler 3.

The heat dissipation device 1 is positioned within the refrigerant 4 contained in the immersion cooler 3 of FIG. 2, and as the heat dissipation device 1 is immersed and cooled, the bubbles 2 are generated in the heat dissipation device 1 (e.g., at a heat dissipation device surface 1*a* thereof).

As described above, the bubbles 2 are generated in the refrigerant 4 in contact with the heat dissipation device 1 (e.g., at the heat dissipation device surface 1*a*). For example, the refrigerant 4 is vaporized by the action of the heat of the heat dissipation device 1 immersed in the refrigerant 4, the bubbles 2 are generated on the heat dissipation device 1. In the description below, the bubbles 2 are simplified and described as occurring in the heat dissipation device 1.

FIG. 2 shows the power generation system 10 installed in an electronic device that includes a controller that generates a large amount of heat among various configurations of SSDs. That is, in FIG. 2, the controller is shown specifically as the heat dissipation device 1.

As shown in FIG. 2, the power generation system 10 may be installed at each of four separate, respective heat dissipation devices 1. In FIG. 2, the heat dissipation device 1 is standing vertically (e.g., such that an in-plane direction, or a direction of the heat dissipation device surface 1*a*, extends parallel or substantially parallel to the vertical direction Z), and the second connector 220 is positioned to extend perpendicular or substantially perpendicular to the heat dissipation device 1 (e.g., to extend perpendicular or substantially perpendicular to the heat dissipation device surface 1*a*). The blade portion 120 of the turbine 100 fixed to the first connector 210 connected to the second connector 220 is positioned horizontally with a bottom surface of the container 3*a* which at least partially defines a bottom end 3*s* of the immersion cooler 3. For example, the blade portion 120 may extend parallel or substantially parallel to the bottom end 3*s* of the immersion cooler 3. In another example, the blade portion 120 may extend perpendicular or substantially perpendicular to the vertical direction Z and/or the direction of gravity.

It will be understood that the heat dissipating device 1 is not limited to electronic devices such as SSDs, and the heat dissipating device 1 may be a server, or may include various other products, devices, or the like that generate heat.

As shown, the bubbles 2 are generated in each heat dissipation device 1 immersed in the refrigerant 4 (e.g., at the respective heat dissipation device surfaces 1*a* thereof), and the bubbles 2 move in a direction opposite to gravity, for example moving upward along the Z axis in FIG. 2, in a vertical direction Z that is parallel and opposite to the direction of gravity.

The power generation system 10 according to some example embodiments of the present inventive concepts is configured to be positioned close to the heat dissipation device 1, so that the bubbles 2 generated in the heat dissipation device 1 and moving upward pass through the power generation system 10 and may impinge on one or more a blade portion 120 of the turbine 100 (e.g., one or more lower surfaces 120*s* thereof) of the power generation system 10.

Referring to FIGS. 1 and 2, the power generation system 10 includes the turbine 100 having the rotating blade portion 120. By the action of rising pressure of the bubbles 2 moving upward in the vertical direction Z from at least a portion of the heat dissipation device surface 1*a* at which the bubbles 2 are generated, the pressure exerted by the rising bubbles 2 on the blade portion 120 (e.g., a rising pressure, directed in the vertical direction Z and exerted by the bubbles 2 in the vertical direction Z on one or more lower surfaces 120*s* of one or more turbine blades of the blade portion 120) may cause the blade portion 120 of the turbine 100 to rotate with respect to the turbine shaft 110 (e.g., rotate around the central longitudinal axis 110*x* of the turbine shaft 110), to thereby cause the turbine 100 to rotate 100*r*.

A rotational force is generated as the blade portion 120 rotates, and kinetic energy is generated in the turbine 100. The converter 300 connected to the turbine 100 serves (e.g., may be configured) to convert kinetic energy generated by the turbine 100 into electrical energy.

The converter 300 may include a generator (also referred to herein as an electrical generator). A generator is a device that produces electrical energy using an electromagnetic induction phenomenon, and the rotational movement of the turbine 100 may be converted into electrical energy through the generator. In some example embodiments, the converter 300 includes an electrical generator that is mechanically connected 300*w* to the turbine shaft 110, directly or indirectly (e.g., via a mechanical transmission), and the rotation 100*r* of the turbine, based on the rotation of the blade portion 120, may include rotation of the turbine shaft 110 connected to the blade portion 120 to drive the electrical generator of the converter 300.

FIGS. 3A, 3B, 4A, and 4B illustrate the power generation system 10 according to some example embodiments, including example embodiments where the power generation system 10 includes a weight 250.

Unlike some example embodiments, including the example embodiments shown in FIGS. 1 and 2, the power generation system 10 according to some example embodiments, including the example embodiments shown in FIGS. 3 and 4 may further include the weight 250. The weight 250 may comprise a mass of material. The weight 250 may comprise any material, including for example a mass of plastic material, a mass of metal material (e.g., stainless steel), any combination thereof, or the like.

Figure 3A:
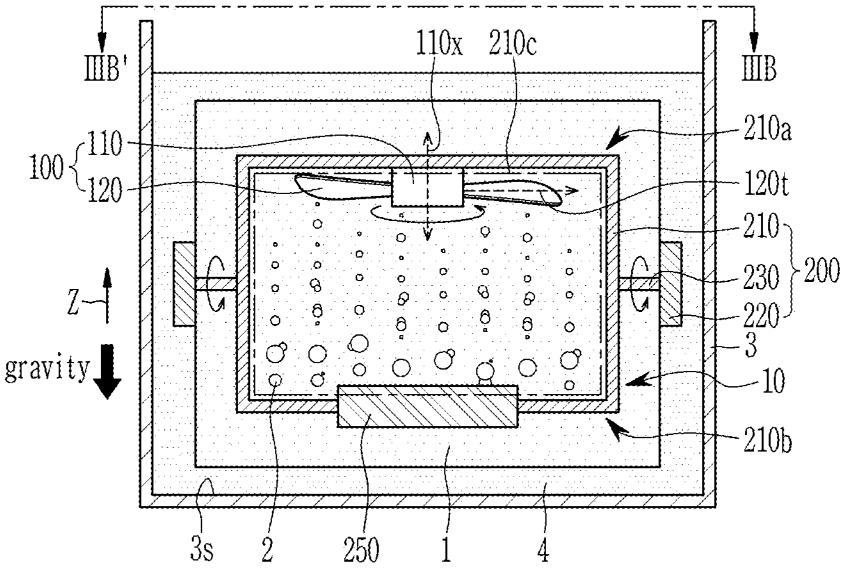
FIG. 3A, FIG. 3B, FIG. 4A, and FIG. 4B illustrate diagrams of a power generation system according to some example embodiments of the present inventive concepts.

First, FIG. 3A shows an internal side cross-section of the immersion cooler 3. As shown, the weight 250 connected to the first connector 210 may be positioned to face the turbine 100. That is, the turbine 100 may be positioned at a first side 210*a* (e.g., first member) of the first connector 210, and the weight 250 may be positioned at a second side 210*b* (e.g., second member), which is opposite to the first side 210*a* of the first connector 210. Restated, the second side 210*b* may be an opposite side relative to the first side 210*a*, such that the turbine 100 and the weight 250 may be at opposite sides of the first connector 210.

Figure 3B:
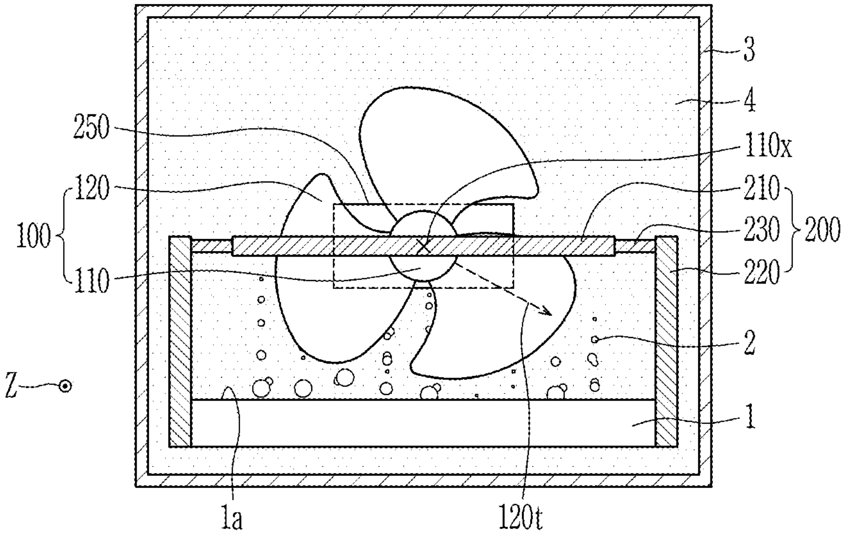

The weight 250 is intended (e.g., configured) to be heavier than the turbine 100. Accordingly, the weight 250 is positioned at a lower side of the turbine 100 by gravity (e.g., the weight 250 is beneath the turbine 100 in the direction of gravity and/or the vertical direction Z). For example, as shown in FIGS. 3A and 3B, the weight 250 may be configured to cause the second side 210*b* of the first connector 210 to be positioned lower than the first side 210*a* of the first connector 210 in the vertical direction Z, for example such that the weight 250 and the second side 210*b* of the first connector 210 are closer to the bottom end 3*s* of the immersion cooler 3 in the vertical direction Z than the turbine 100 and the first side 210*a* of the first connector 210.

When viewed in a direction in which the first connector 210 is positioned, a second side of the first connector 210 moves lower than the first side of the first connector 210 by the action of gravity. That is, the weight 250 disposed at the second side of the first connector 210 may be configured to move under gravity and the mass (e.g., weight) of the weight 250 to be positioned lower than the turbine 100 due to the greater weight of the weight 250 in relation to the turbine 100 and the direction of gravity. Accordingly, a position of the turbine 100 may be aligned (e.g., may be positioned by the connector 200 to at least partially overlap the weight 250 in the vertical direction Z and/or the direction of gravity).

A shape and number (quantity) of weights 250 is not limited to those shown in FIG. 3A, and as long as the weight of the weight 250 is greater than the weight of the turbine 100, the shape and number of the weight 250 are not limited.

In addition, a connection method by which the weight 250 is connected to the first connector 210 is also not limited to the structure shown in FIGS. 3A, 3B, 4A, and 4B. According to some example embodiments, the weight 250 may be connected to a second side of the first connector 210 in a latch manner.

FIG. 3B illustrates the immersion cooler 3 of FIG. 3A as seen from above (e.g., as seen from a direction parallel to the vertical direction Z and/or the direction of gravity). As shown, FIG. 3B may illustrate a view along line IIIB-IIIB' in FIG. 3A.

Referring to FIGS. 3A and 3B, some example embodiments, including the example embodiments shown in FIGS. 3A and 3B, may include a system wherein the heat dissipation device 1 is standing in the refrigerant 4. That is, the heat dissipation device 1 is standing vertically, as in the heat dissipation device 1 in FIG. 2, for example such that the heat dissipation device surface 1*a* extends parallel or substantially parallel to the direction of gravity and/or the vertical direction Z.

When viewed in FIG. 3A, the first connector 210 having a quadrangular frame shape is positioned in parallel with the heat dissipation device 1 (e.g., the first connector 210 at least partially defines a plane extending through the quadrangular frame which further extends parallel or substantially parallel with the heat dissipation device surface 1*a*. That is, it may be seen that the first connector 210 and the heat dissipation device 1 are positioned such that an area 210*c* formed (e.g., defined) by the quadrangular frame of the first connector 210 and a wide surface of the heat dissipation device 1 (e.g., the heat dissipation device surface 1*a*) face each other.

Referring to FIG. 3B, when the heat dissipation device 1 is standing up, the blade portion 120 of the turbine 100 may be positioned horizontally with a bottom surface (e.g., bottom end 3*s*) of the immersion cooler 3. That is, the blade portion 120 is positioned vertically with the heat dissipation device 1, such that the blade portion 120 (e.g., the plurality of turbine blades) may extend parallel or substantially parallel with the bottom end 3*s* of the immersion cooler 3 (e.g., may define a plane extending through the plurality of turbine blades and further extending parallel or substantially parallel with the bottom end 3*s* of the immersion cooler 3) and may extend perpendicular or substantially perpendicular to the heat dissipation device surface 1*a* of the heat generation device 1. As a result, the central longitudinal axis 110*x* of the turbine shaft 110 may extend parallel or substantially parallel to the heat dissipation device surface 1*a*.

It will be understood that where a blade portion 120 is described to "extend" in a particular direction, the blade length 120*t* of one or more of the turbine blades (e.g., extending from blade root or central longitudinal axis 110*x* to blade tip, which may be a blade length extending in a span direction extending radially from the central longitudinal axis 110*x*), extends in the particular direction. For example, in example embodiments where the blade portion 120 is described to extend perpendicular or substantially perpendicular to the heat dissipation device surface 1*a* of the heat generation device 1, it will be understood that the blade length 120*t* and/or the blade span of the blade portion 120 as a whole extend perpendicular or substantially perpendicular to the heat dissipation device surface 1*a* of the heat generation device 1.

The blade portions 120 positioned horizontally with the bottom surface of the immersion cooler 3 (e.g., such that the blade length 120*t* and/or the blade span of the blade portion 120 as a whole, extend parallel or substantially parallel with the bottom end 3*s* at least partially defined by the bottom surface of the container 3*a*) may be easily rotated around central longitudinal axis 110*x* by the bubbles 2 moving upward (rising) in the vertical direction Z, based on rising pressure exerted by the rising bubbles 2 on an underside of the blade portion 120 (e.g., an underside of one or more blade turbines).

Figure 4A:
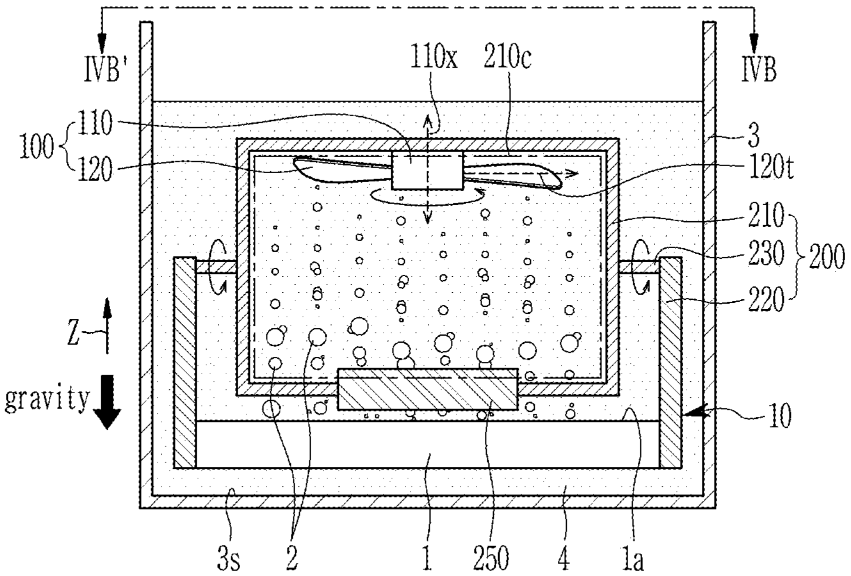
Figure 4B:
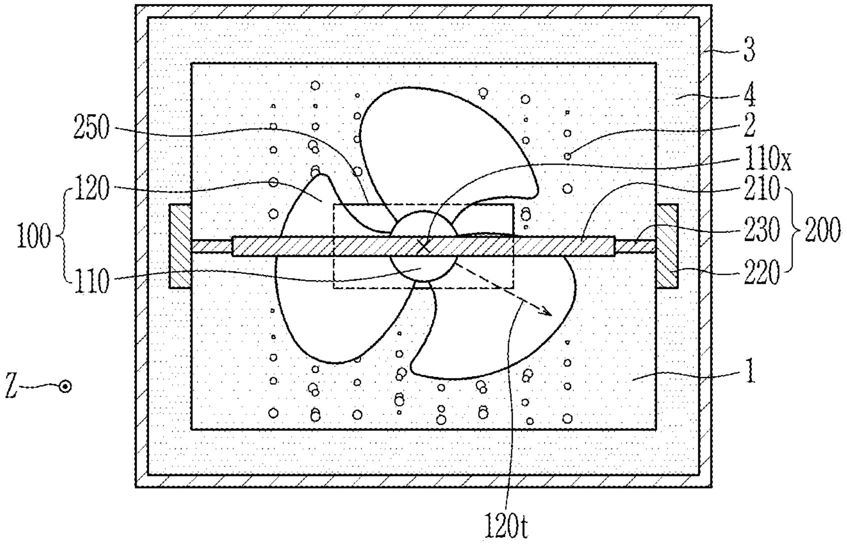

FIG. 4A shows an internal side cross-section of the immersion cooler 3, and FIG. 4B shows the immersion cooler 3 of FIG. 4A as seen from above, for example along line IVB-IVB' in FIG. 4A.

Unlike FIGS. 3A and 3B, FIGS. 4A and 4B show the heat dissipation device 1 lying horizontally on the bottom of the immersion cooler 3, for example such that the heat dissipation device surface 1*a* extends parallel or substantially parallel to the bottom end 3*s* of the immersion cooler 3 and the heat dissipation device 1 is proximate to the bottom end 3*s* of the immersion cooler 3.

A disposition structure (e.g., position and/or orientation in relation to the immersion cooler 3, the direction of gravity, the vertical direction Z, any combination thereof, or the like) of the power generation system 10 may be confirmed, which changes depending on the disposition direction of the heat dissipation device 1, by comparing disposition directions (e.g., respective positions and/or orientations) of the heat dissipation device 1 and the power generation system 10 shown in FIGS. 3A, 3B, 4A, and 4B.

Specifically, as illustrated in FIG. 4A, the heat dissipation device 1 and the first connector 210 are positioned vertically. That is, it may be seen that the heat dissipation device 1 is positioned so that the area 210*c* (e.g., planar area) formed by the quadrangular frame of the first connector 210 and the wide surface (e.g., heat dissipation device surface 1*a*) of the heat dissipation device 1 are perpendicular or substantially perpendicular to each other.

In some example embodiments, including the example embodiments as shown in FIG. 4B, the blade portion 120 of the turbine 100 are positioned horizontally with the bottom side 3*s* of the immersion cooler 3. That is, the blade portion 120 (e.g., the turbine blades thereof, as shown in FIGS. 4A and 4B) is positioned horizontally with the heat dissipation device 1 (e.g., the blade length 120*t* extending parallel or substantially parallel with the heat dissipation device surface 1*a*).

In FIGS. 4A and 4B, as in FIGS. 3A and 3B, the blade portion 120 positioned horizontally with the bottom surface of the immersion cooler 3 may be easily rotated around the central longitudinal axis 110*x* by the bubbles 2 moving upward (rising) in the vertical direction Z, based on rising pressure exerted by the rising bubbles 2 on one or more lower surfaces 120*s* of the blade portion 120 (e.g., one or more lower surfaces 120*s* of one or more blade turbines).

As described above, depending on a direction in which the heat dissipation device 1 is positioned and/or oriented, a direction in which the first connector 210 and the turbine 100 connected to the first connector 210 face (e.g., are oriented) may be different. This is because, as the first rotator 230 rotates 230*r*, the first connector 210 rotates together with the first rotator 230 around the first rotation axis 230*x*.

The power generation system 10 according to some example embodiments of the present inventive concepts is characterized in that the disposition structure (e.g., position and/or orientation) of the turbine 100 attached to the heat dissipation device 1 (e.g., the relative orientation of the turbine 100 in relation to the heat dissipation device 1) automatically changes depending on the direction in which the heat dissipation device 1 is positioned (e.g., based on the position and/or orientation of the heat dissipation device 1 and the heat dissipation device surface 1*a* thereof in relation to gravity).

Specifically, the disposition structure (e.g., position and/or orientation of the turbine 100 in relation to the heat dissipation device 1) is automatically changed so that the blade portion 120 of the turbine 100 are arranged horizontally with (e.g., the turbine blades thereof have respective blade lengths 120*t* extending in parallel with) the bottom end 3*s* of the immersion cooler 3, so as to enable the bubbles 2 generated in the heat dissipation device 1 (e.g., at the heat dissipation device surface 1*a* thereof) and rising in the vertical direction Z to always rotate the blade portion 120 of the turbine 100 regardless of the placement direction (e.g., position and/or orientation) of the heat dissipation device 1.

As a result, the power generation system 10 according to some example embodiments of the present inventive concepts may be configured to generate electrical energy based on driving the turbine 100 using the rising pressure of the bubbles 2 generated in the immersion cooling process of cooling the heat dissipation device 1.

The position and/or orientation of the turbine 100 may be automatically aligned so that the blade portion 120 of the turbine 100 moves upward, against the direction of gravity, regardless of the direction in which the heat dissipation device 1 is positioned and/or oriented, so the turbine 100 may be driven by the bubbles 2 that are always generated to rise in the heat dissipation device 1 to rotate the turbine blades of the blade portion 120 of the turbine 100.

Figure 5A:
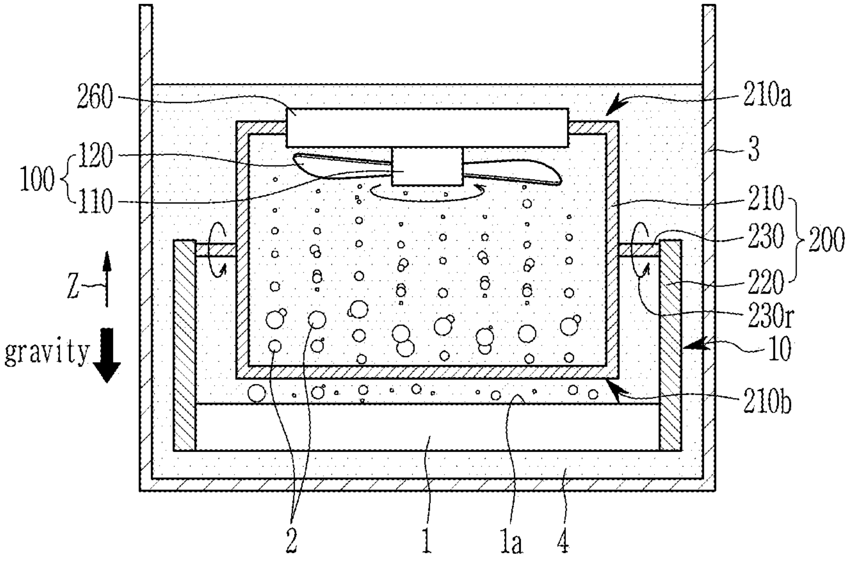
FIG. 5A, FIG. 5B, and FIG. 6 illustrate a power generation system according to some example embodiments of the present inventive concepts.
Figure 5B:
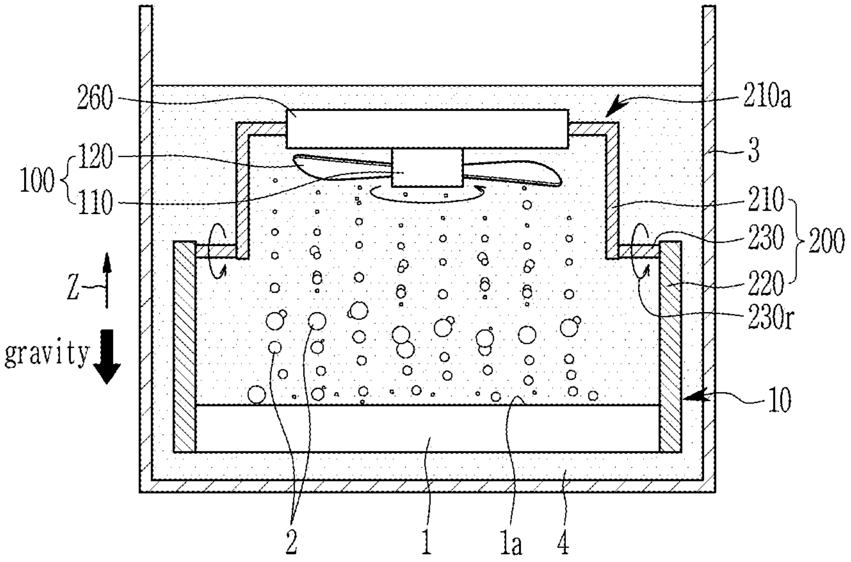
Figure 6:
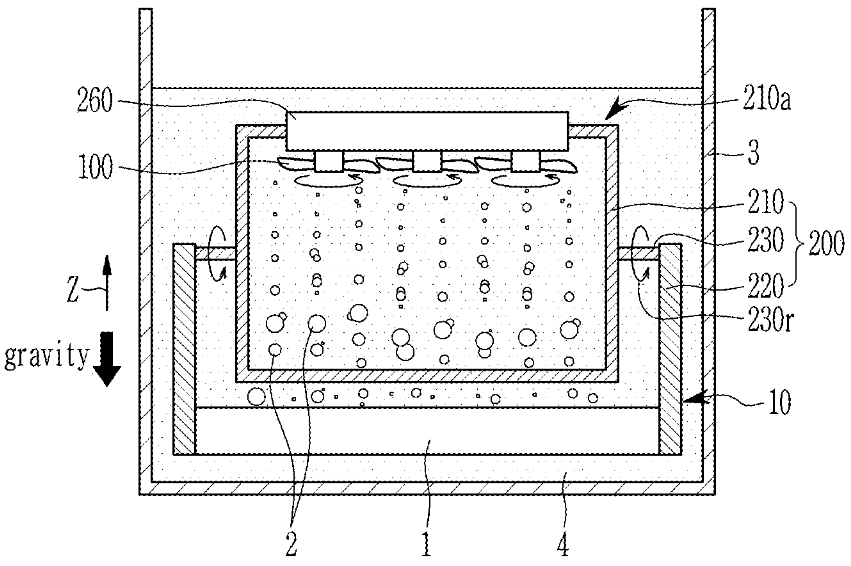

FIGS. 5A, 5B, and 6 illustrate a power generation system 10 further including an air pocket 260 according to some example embodiments.

Unlike some example embodiments, including the example embodiments shown in FIGS. 1 and 2, the power generation system 10 in some example embodiments, including the example embodiments shown in FIGS. 5A, 5B, and 6 may further include the air pocket 260.

In the case of FIGS. 3A and 3B and FIGS. 4A and 4B, the power generation system 10 may include a weight 250 that may be positioned on the other side of the connector 200 (e.g., the second side 210*b* of the first connector 210, opposite from the first side 210*a* of the first connector 210 at which the turbine 100 is fixed to the connector 200), and by the action of gravity, the weight 250 may move lower than the turbine 100 (e.g., move in the direction of gravity, towards the bottom end 3*s*), to align a position and/or orientation of the turbine 100 (e.g., aligned in relation to the heat dissipation device surface 1*a* to position the turbine 100 in the refrigerant 4 above at least a portion of the heat dissipation device surface 1*a* in the vertical direction Z, to configure the turbine 100 to rotate 100*r* based on an action of rising pressure exerted by bubbles 2, based on the bubbles 2 rising at least partially in the vertical direction Z from the heat dissipation device surface 1*a* to impinge on the plurality of turbine blades).

In contrast, in some example embodiments, including the example embodiments shown in FIGS. 5A, 5B, and 6, the power generation system 10 may include an air pocket 260. The air pocket 260 may include a structure defining a closed enclosure (e.g., a closed internal space) which may be filled with a gas, such as air, or in some example embodiments may be at least partially evacuated (e.g., a vacuum). The air pocket 260 may comprise a structure of any material, including a plastic structure, a metal structure, or any combination thereof. The air pocket 260 may be further positioned (e.g., fixed to the connector 200) at a first side 210*a* of the first connector 210. A gas, such as air, may be contained inside the air pocket 260 (e.g., the internal space defined within the interior of the air pocket 260 by the structure of the air pocket 260, which may be a completely closed internal space), so the air pocket 260 has buoyancy in the refrigerant 4. It will be understood that the air pocket 260 is not limited to being filled with air.

By the action of the buoyancy generated in the air pocket 260, the first side of the first connector 210 moves more upward in the vertical direction Z, opposite to the direction of gravity, and thereby may move above an opposite second side 210*b* of the first connector 210. For example, the air pocket 260 at the first side 210*a* of the first connector 210 may be configured to cause the first side 210*a* of the first connector 210 to be positioned higher than a second side 210*b* of the first connector in the refrigerant 4 and in the vertical direction Z.

That is, the air pocket 260 moves upward in the vertical direction Z, opposite the direction of gravity, by the action of the buoyancy of the air pocket 260, and as a result, the turbine 100 moves upward in the vertical direction Z, opposite the direction of gravity and the position and/or orientation thereof is aligned (e.g., aligned in relation to the heat dissipation device surface 1*a* to position the turbine 100 in the refrigerant 4 above at least a portion of the heat dissipation device surface 1*a* in the vertical direction Z, to configure the turbine 100 to rotate 100*r* based on an action of rising pressure exerted by bubbles 2, based on the bubbles 2 rising at least partially in the vertical direction Z from the heat dissipation device surface 1*a* to impinge on the plurality of turbine blades).

The power generation system 10 according to some example embodiments of the present inventive concepts is configured to enable the first connector 210 to rotate together with rotation 230*r* of the first rotator 230, even if the direction in which the heat dissipation device 1 is positioned within the refrigerant 4 (e.g., the position and/or orientation of the heat dissipation device surface 1*a* in the refrigerant 4 and/or the immersion cooler 3) changes. During the rotation of the first connector 210, the first side 210*a* of the first connector 210 rises upward in the vertical direction Z by the action of gravity and buoyancy. That is, the turbine 100 positioned at the first side of the first connector 210 is always aligned at an upper side of the immersion cooler 3, distal from the bottom end 3*s* of the immersion cooler 3.

Accordingly, the bubbles 2 generated in the heat dissipation device 1 (e.g., at the heat dissipation device surface 1*a*) and rising upward in the vertical direction Z passes through the turbine 100, and in this process, the blade portion 120 of the turbine 100 rotates relative to the turbine shaft 110 (e.g., rotates around the central longitudinal axis 110*x*) by the action of the rising pressure of the bubbles 2, for example action of rising pressure on one or more lower surfaces 120*s* of the blade portion 120.

In FIG. 5A, one turbine 100 is positioned at the first side 210*a* of the first connector 210, and one air pocket 260 is positioned at the first side 210*a*.

FIG. 5B illustrates a power generation system 10 according to some example embodiments in which the second side 210*b* of the first connector 210 is removed, which is different from the example embodiments shown in FIG. 5A.

The first connector 210 may be configured to fix the turbine 100 and also serves to align the direction of the turbine 100 (e.g., in relation to the vertical direction Z) by being connected to the first rotator 230 and rotating with the rotation 230*r* of the first rotator 230. As shown in FIG. 5B, even when the first side 210*a* of the first connector 210 is present, the first connector 210 may fix the turbine 100 and may be connected to the first rotator 230 to align the turbine 100 (e.g., align in relation to the heat dissipation device surface 1*a* to position the turbine 100 in the refrigerant 4 above at least a portion of the heat dissipation device surface 1*a* in the vertical direction Z, to configure the turbine 100 to rotate 100*r* based on an action of rising pressure exerted by bubbles 2, based on the bubbles 2 rising at least partially in the vertical direction Z from the heat dissipation device surface 1*a* to impinge on the plurality of turbine blades).

Accordingly, the power generation system 10 according to some example embodiments of the present inventive concepts may further include a first connector 210 in which the second side 210*b* of the first connector 210 is removed, as shown in FIG. 5B.

In some example embodiments, there are no obstacles on a movement path of the bubbles 2 rising from a lower portion (e.g., from a heat dissipation device surface 1*a* located below the turbine 100 in the vertical direction Z), so there is an advantage of increasing utilization of the bubbles 2 generated from the lower portion by the turbine 100 (e.g., increased rising pressure exerted on the blade portion 120 by the rising bubbles 2 based on the reduced obstructions in the vertical direction Z between the blade portion 120 and the heat dissipation device surface 1*a*).

That is, when the second side 210*b* of the first connector 210 is removed, the rising bubbles 2 do not collide with the second side 210*b* of the first connector 210 in a process of rising from the heat dissipation device surface 1*a* in the vertical direction Z, thereby reducing or minimizing an amount of the bubble 2 that is removed or obstructed from impinging upon the blade portion 120, and thus increasing or maximizing the amount of bubbles 2 impinging on one or more lower surfaces 120*s* of the blade portion 120 to exert rising pressure on the blade portion 120 to cause the turbine 100 to rotate 100*r*. Accordingly, it is possible to make full use of the bubbles 2 rising from below, thereby improving the operational efficiency of the power generation system 10 and thus improving the electrical power generation by the power generation system 10 to improve the power consumption efficiency of the heat dissipation device 1 based on using electrical energy generated by the power generation system 10. In addition, or in the alternative, a material cost to construct the first connector 210 may be reduced, thereby reducing the material cost of the power generation system 10 without compromising electrical power generation by the power generation system 10 and thereby improving the cost-effectiveness of the power generation system 10.

In some example embodiments, the power generation system 10 may include a plurality of turbines 100, wherein the connector 200 may be configured to connect the plurality of turbines 100 and the heat dissipation device 1 to position respective turbine shafts 110 of the plurality of turbines 100 to extend parallel to the direction of gravity, and position the plurality of turbines 100 in the refrigerant 4 above at least the portion of the heat dissipation device surface 1*a* in the vertical direction Z, to configure each separate turbine 100 of the plurality of turbines 100 to rotate 100*r* based on the bubbles 2 rising at least partially in the vertical direction Z from the heat dissipation device surface 1*a* to impinge on respective turbine blades (e.g., undersides thereof) of the plurality of turbines 100.

For example, as shown in FIG. 6, a power generation system 10 may include three turbines 100 that may be positioned at the first side 210*a* of the first connector 210, and one air pocket 260 is positioned at the first side 210*a*. It will be understood that the quantity of turbines 100 is not limited to three.

A shape and number (quantity) of the turbine 100 and the air pocket 260 are not limited to those shown in FIGS. 5A, 5B, and 6, and at least one turbine 100 and/or air pocket 260 may be positioned at the first side 210*a* of the first connector 210.

A connection method by which the air pocket 260 is connected to the first connector 210 is also not limited to the structure shown in FIGS. 5A, 5B, and 6.

In addition, the power generation system 10 according to the present inventive concepts may include at least one of the weight 250 or the air pocket 260. In some example embodiments, and the power generation system 10 may include both the weight 250 and the air pocket 260.

The first connector 210 shown in FIGS. 1 to 6 has a quadrangular frame shape, and in this case, a portion excluding the frame shape is open. Accordingly, a periphery of the first connector 210 immersed in the refrigerant 4 is surrounded by the refrigerant 4, and the refrigerant 4 flows freely.

Figure 7A:
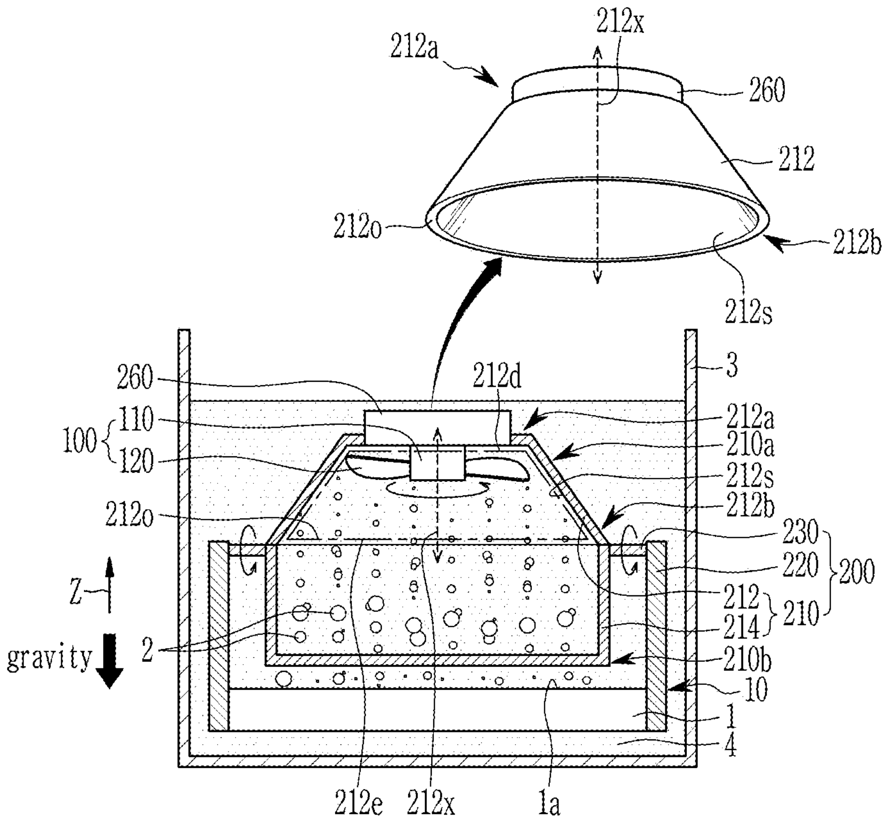
FIG. 7A, FIG. 7B, and FIG. 8 illustrate a power generation system according to some example embodiments of the present inventive concepts.
Figure 7B:
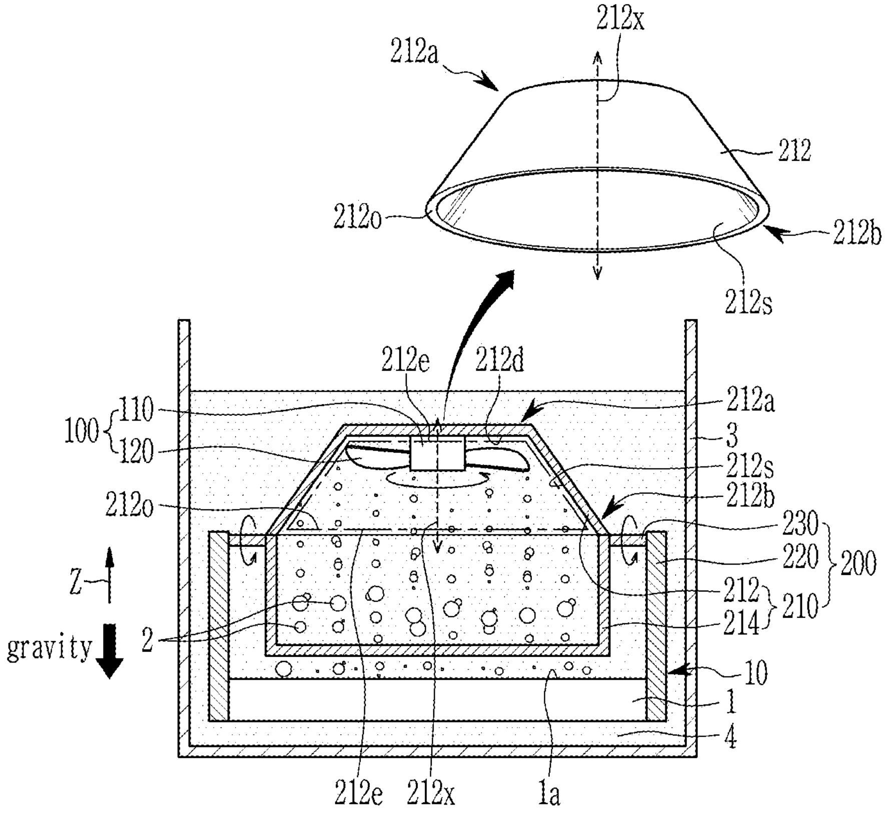
Figure 8:
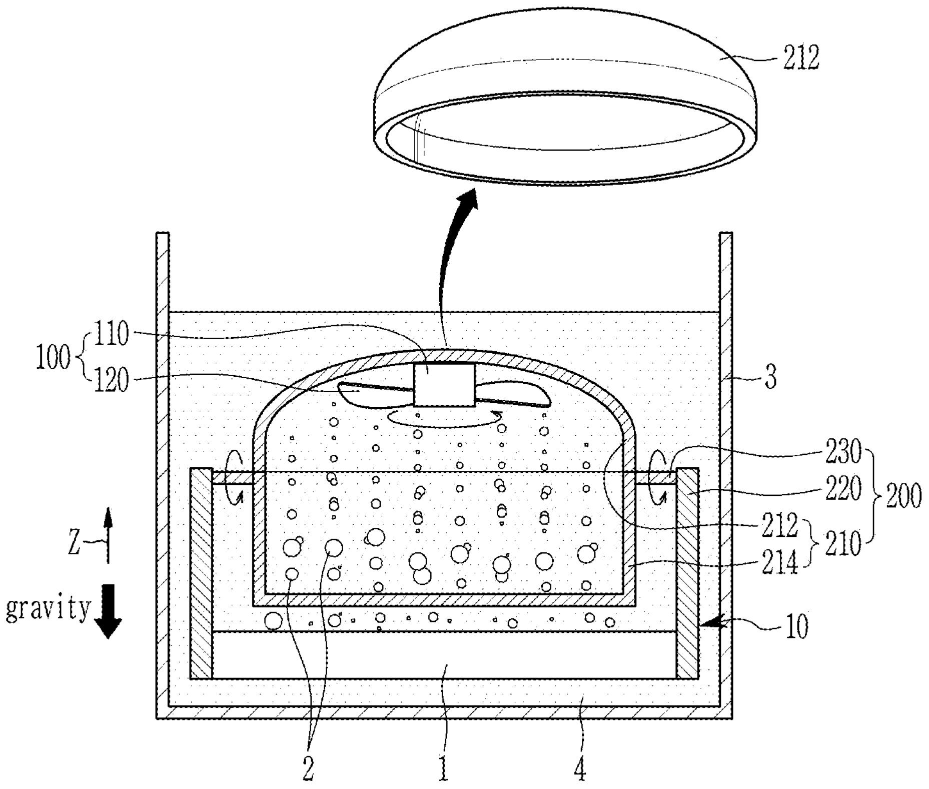

FIGS. 7A, 7B, and 8 illustrate a power generation system 10 according to some example embodiments.

Unlike some example embodiments, including example embodiments where the power generation system 10 includes a first connector 210 having the quadrangular frame shape, for example as shown in FIGS. 1 to 6, in some example embodiments, including the example embodiments shown in FIGS. 7A, 7B, and 8, the power generation system 10 may include a first connector 210 having a closed shape at a first side (upper portion).

First, as shown in FIG. 7A, the first connector 210 may include a closed portion 212 (also referred to herein as an enclosure structure, enclosure member, or the like) having a first side 212*a* closed (e.g., a closed end 212*d*, which may be defined by one or more surfaces of the closed portion 212 and/or the air pocket 260), and an opening 214 (also referred to herein as an open structure, an open member, or the like) where a first side and a second side facing each other have an open shape through which the bubbles 2 may pass. For example, as shown, the closed portion 212 may be a structure having one or more inner surfaces 212*s* at least partially (alone or together with one or more surfaces of another structure including for example the air pocket 260) defining an enclosure 212*e* having a closed end 212*d* (also referred to herein as a closed side) at the first side 212*a* and an enclosure opening 212*o* into the enclosure 212*e* at an opposite second side 212*b* of the closed portion 212. The enclosure opening 212*o* may be configured to direct at least a portion of the bubbles 2 rising at least partially in the vertical direction Z from the heat dissipation device surface 1*a* to move into the enclosure 212*e* of the closed portion 212, where such bubbles 2 may collected (e.g., trapped) due to the enclosure 212*e* being closed at the closed end 212*d* at the first side 212*a*.

In FIG. 7A, the opening 214 is shown as having a bar shape. However, the present inventive concepts are not limited thereto, and in some example embodiments a material positioned at the second side of the first connector 210 may be omitted, as shown in FIG. 5B.

The closed portion 212 may be configured to collect the bubbles 2 generated in the heat dissipation device 1 and moving upward (e.g., moving in the vertical direction Z opposite the direction of gravity), for example through the enclosure opening 212*o* into the enclosure 212*e*. In some example embodiments, the closed portion 212 includes one or more openings at the first side 212*a* to permit at least a portion of the vaporized refrigerant comprising the collected bubbles 2 at the closed end 212*d* to escape the closed portion 212, although example embodiments are not limited thereto and in some example embodiments such openings may be omitted.

As shown, the air pocket 260 may be positioned at the first side 210*a* of the first connector 210. The air pocket 260 may be configured to set the disposition direction (e.g., position and/or orientation) of the first connector 210 in a process of repositioning the first connector 210 by the action of buoyancy of the air pocket 260 in response to a change in the disposition structure (e.g., orientation and/or position) of the heat dissipation device 1, etc. For example, when a first side (e.g., heat dissipation device surface 1*a*) of the heat generation device 1 is positioned to face a direction other than the upper side of the immersion cooler 3, the air pocket 260 may cause the first side 210*a* of the first connector 210 to be positioned toward the upper side of the immersion cooler 3, such that the turbine 100 is positioned to receive bubbles 2 rising in the vertical direction Z towards the upper side of the immersion cooler 3 (e.g., moving opposite to the direction of gravity) from the first side (e.g., heat dissipation device surface 1*a*) of the heat generation device 1 even though the first side (e.g., heat dissipation device surface 1*a*) of the heat generation device 1 may be facing in a direction other than the vertical direction Z.

The air pocket 260 may be configured to rearrange the posture (e.g., the position and/or orientation) of the first connector 210 such that the first side 210*a* of the first connector 210 at which the air pocket 260 is located is positioned in a best position in the immersion cooler 3.

In addition, the first connector 210 shown in FIG. 7A may serve as a funnel to collect the bubbles 2, and buoyancy may be generated at the first side 210*a* of the first connector 210 by the bubbles 2 collected in the closed portion 212 of the first connector 210. The buoyancy generated in the first connector 210 may serve to move the first side of the first connector 210 upward (e.g., in the vertical direction Z) along with the buoyancy of the air pocket 260.

As a result, the air pocket 260 may be configured to maintain the initial position of the first connector 210 such that the first side 210*a* of the first connector 210 is at or proximate to an upper side of the immersion cooler 3 in relation to an opposite second side 210*b* of the first connector 210, and also, buoyancy of the air pocket 260 and the first connector 210 serves to maintain the first side of the first connector 210 positioned at or proximate to the upper side.

The turbine 100 may be positioned inside the first connector 210 (e.g., inside the enclosure 212*e* at least partially defined by one or more inner surfaces 212*s* of the closed portion 212). That is, the turbine 100 may be positioned close to the closed portion 212 and/or within the closed portion 212.

As the closed portion 212 may be aligned (e.g., positioned and/or oriented) upward by the action of buoyancy (e.g., due to buoyancy provided by the air pocket 260 and/or buoyancy provided by bubbles collected at the closed end of the closed portion 212), the turbine 100 positioned close to the closed portion 212 may also be aligned (e.g., positioned and/or oriented) upward so as to be at or proximate to an upper side of the immersion cooler 3 and thus to be above at least a portion of the heat dissipation device surface 1*a* in the vertical direction Z.

A horizontal cross-sectional area of the closed portion 212 may be narrowed to a first side, as shown in FIG. 7A. For example, as shown, the closed portion 212 may be at least partially tapered along a closed portion axis 212*x* (which may be a central longitudinal axis of the closed portion 212) from the second side 212*b* of the closed portion 212 to the first side 212*a* of the closed portion 212 such that a cross-sectional area of the closed portion 212 in a plane perpendicular to the closed portion axis 212*x* narrows from the second side 212*b* of the closed portion 212 (at which the enclosure opening 212*o* may be located) toward the first side 212*a* of the closed portion 212 (at which the closed shape of the enclosure 212*e* may be defined) along the closed portion axis 212*x*. Thus, the closed portion 212 may have a funnel shape, a conical shape, a truncated conical shape, or the like.

Referring to FIG. 7B, in some example embodiments, and unlike some example embodiments including the example embodiments shown in FIG. 7A, the power generation system 10 may include the closed portion 212 and may omit the air pocket 260.

In FIG. 7B where the air pocket 260 is not included (e.g., the power generation system 10 omits the air pocket 260), the buoyancy generated by the first connector 210 having a funnel shape may be configured to move the position of the first connector 210. The first connector 210 may generate buoyancy by collecting the bubbles 2 at a closed end 212*d* thereof, causing the first side 210*a* of the first connector 210 to move upward (e.g., to move in the vertical direction Z opposite the direction of gravity).

However, in the case of FIG. 7B, when the first side 210*a* of the first connector 210 is positioned to face downward (e.g., in the direction of gravity), it may be difficult to collect the bubbles 2 at the end of the first connector 210, and even if the bubbles 2 can be collected, there may a disadvantage in that it takes a long time to collect a sufficient amount of bubbles 2 to generate sufficient buoyancy to cause the first side 210*a* of the first connector 210 to move upward in the vertical direction Z to thereby position the turbine 100 at or proximate to the upper side of the immersion cooler 3.

This is because if the closed portion 212 of the first connector 210 is positioned to face downward, unless the disposition direction (e.g., position and/or orientation) is changed such that the closed portion 212 faces upward, the bubbles 2 may not be collected in the closed portion 212 facing downward.

Accordingly, it may be desirable to position the air pocket 260 together as shown in FIG. 7A.

In addition, according to some example embodiments, the first side of the first connector 210 may have a domelike shape, as shown in FIG. 8.

As in FIGS. 7A and 7B, the first side 210*a* of the first connector 210 as shown in FIG. 8 may be the closed portion 212, and the second side 210*b* opposite to the first side may be the opening 214 through which the bubbles 2 pass. Such a dome shaped closed portion 212 may include an air pocket 260, such as shown in FIG. 7A, or may omit an air pocket 260 such as shown in FIG. 8.

Figure 9:
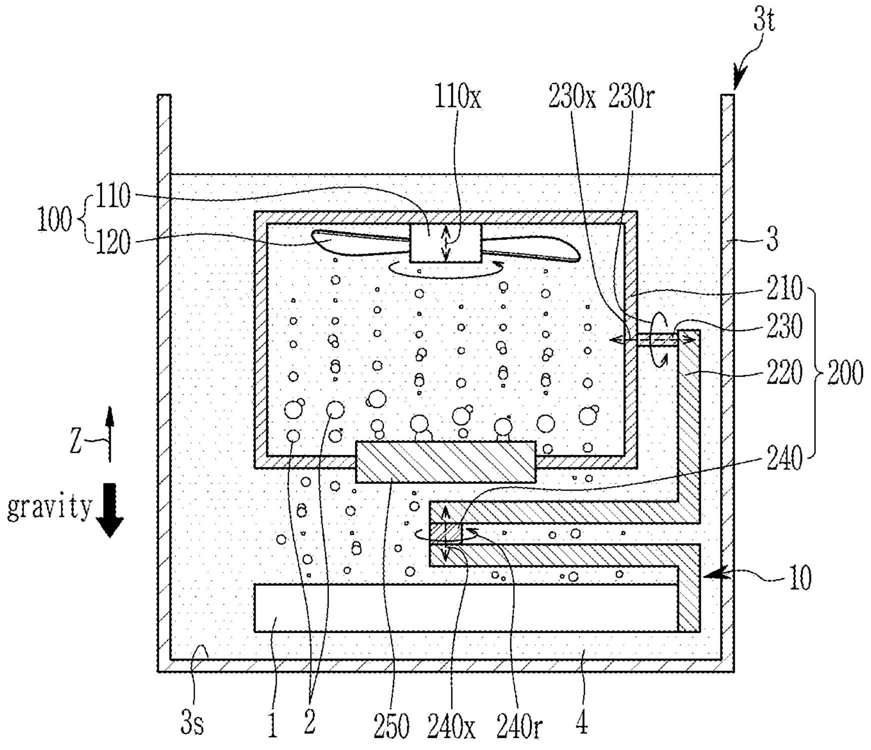
FIG. 9 illustrates a power generation system according to some example embodiments of the present inventive concepts.

FIG. 9 illustrates a power generation system 10 according to some example embodiments.

As shown in FIG. 9, a power generation system 10 according to some example embodiments of the present inventive concepts may include a second connector 220 that may further include a second rotator 240 that is configured to rotate in a direction perpendicular or substantially perpendicular to a direction of rotation of the first rotator 230. For example, the second rotator 240 may be configured to rotate 240*r* around a second axis of rotation-second rotation axis 240*x*—of the second rotator 240, the second rotation axis 240*x* being perpendicular or substantially perpendicular to the first rotation axis 230*x* of the first rotator 230. As shown, the second rotation axis 240*x* may be parallel or substantially parallel to the central longitudinal axis 110*x* of the turbine shaft 110.

In the power generation system 10 according to some example embodiments of the present inventive concepts, the second rotator 240 may rotate 240*r* to align the turbine shaft 110 (e.g., the central longitudinal axis of the turbine shaft 110) to be positioned parallel or substantially parallel to the direction of gravity based on the disposition position (e.g., position and/or orientation) of the heat dissipation device 1, for example in response to a change in the disposition position of the heat dissipation device 1.

As a result, according to rotation 230*r* of the first rotator 230 and rotation 240*r* of the second rotator 240, the blade portion 120 of the turbine 100 is aligned parallel or substantially parallel to the bottom end 3*s* of the immersion cooler 3, so that the blade portion 120 is configured to be rotated by the bubbles 2 rising at least partially in the vertical direction Z, toward the upper side (e.g., upper end 3*t*) of the immersion cooler 3.

A rotation direction of the first rotator 230 and a rotation direction of the second rotator 240 according to a disposition direction of the heat dissipation device 1 and a position of the turbine 100 of the power generation system 10 aligned accordingly will be described through FIGS. 10A to 10D.

FIGS. 10A to 10D illustrate a process in which a disposition structure of the turbine 100 changes in the power generation system 10 according to FIG. 9, according to some example embodiments.

FIGS. 10A to 10D illustrate a process of erecting the heat dissipation device 1 that is initially lying down in the immersion cooler 3 such that the heat dissipation device surface 1*a* extends in parallel or substantially parallel to the bottom side of the immersion cooler 3, and a change in position of the turbine 100 in the power generation system 10 during the above process will be described.

Figure 10A:
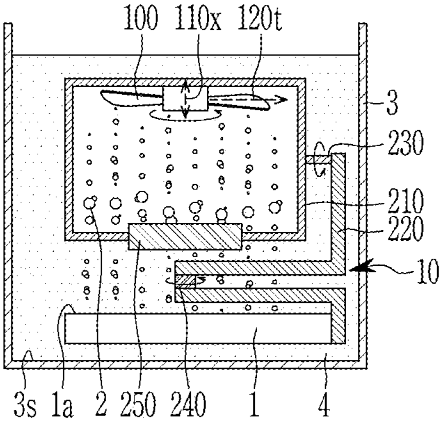
FIGS. 10A, 10B, 10C, and 10D illustrate a process in which a disposition structure of the power generation system according to FIG. 9 changes according to some example embodiments of the present inventive concepts.

FIG. 10A illustrates a state in which the heat dissipation device 1 is laid down on the bottom inside the immersion cooler 3 such that the heat dissipation device surface 1*a* extends in parallel or substantially parallel to the bottom side of the immersion cooler 3 and/or perpendicular to the direction of gravity. In this case, the blade portion 120 of the turbine 100 is positioned horizontally with the bottom (e.g., blade length 120*t* of the blade portion 120 extending parallel or substantially parallel to the bottom end 3*s* of the immersion cooler 3) to face the heat dissipation device 1, such that the turbine 100 is configured to cause the blade portion 120 to receive bubbles 2 rising at least partially in the vertical direction Z towards the upper side of the immersion cooler 3 from at least a portion of the heat dissipation device surface 1*a* and to further rotate the blade portion 120 based on receiving such upwards-rising bubbles 2.

Figure 10B:
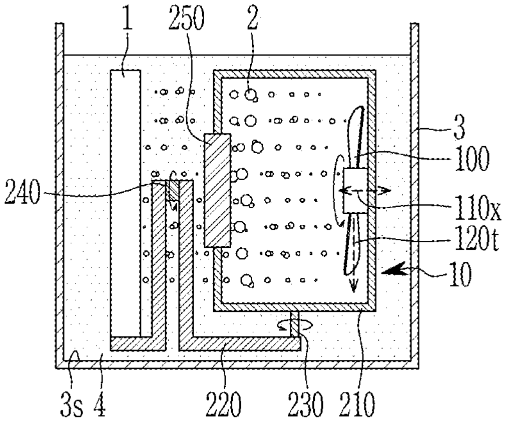

FIG. 10B illustrates the heat dissipation device 1 in FIG. 10A immediately after being erected, such that the heat dissipation device surface 1*a* extends perpendicular or substantially perpendicular to the bottom side of the immersion cooler 3 and/or parallel to the direction of gravity. As an instantaneous state before rotation 230*r* of the first rotator 230 and rotation 240*r* of the second rotator 240, immediately after erecting the heat dissipation device 1, the first and second connectors 210 and 220 and the turbine 100 moved with the erection of the heat dissipation device 1, the turbine 100 is not yet aligned such that the central longitudinal axis 110*x* of the turbine shaft 110 is extending perpendicular or substantially perpendicular to the direction of gravity, and the blade portion 120 is maintained to face the heat dissipation device 1 and the blade length 120*t* of one or more turbine blades thereof extends perpendicular or substantially perpendicular to the bottom side of the immersion cooler 3.

Figure 10C:
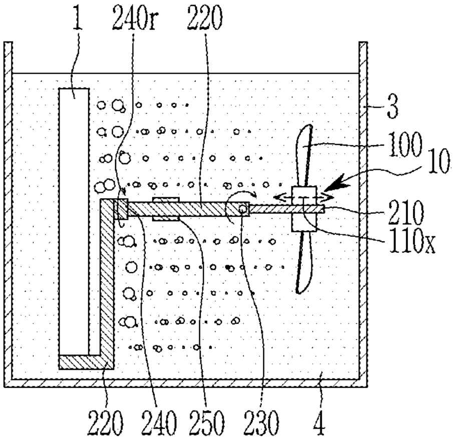
Figure 10D:
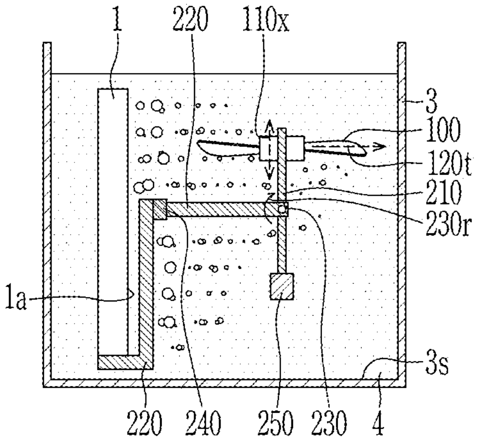

FIGS. 10C and 10D illustrate a process in which the turbine 100 moves by the action of gravity after time has passed from FIG. 10B.

First, as illustrated in FIG. 10C, it may be seen that as the second rotator 240 rotates 240*r*, a direction in which the first connector 210, which has a quadrangular frame shape, is positioned changes. Unlike in FIG. 10B, an area formed (defined) by the quadrangular frame of the first connector 210 in FIG. 10C has been moved to be horizontal (e.g., parallel or substantially parallel) with the bottom end 3*s* of the immersion cooler 3. In this process, the second rotator 240 rotates 240*r*. As a result, and as shown, in FIG. 10C, the first rotator 230 is moved to a position where the axis of rotation of the first rotator 230, first rotation axis 230*x*, extends parallel to the bottom end 3*s* of the immersion cooler 3 such that the first rotator 230 is positioned to cause the turbine 100 to move away from the bottom end 3*s* of the immersion cooler 3 due to rotation of the first connector 210 around the first rotation axis 230*x* of the first rotator 230.

Next, as illustrated in FIG. 10D, it may be seen that as the first rotator 230 rotates 230*r*, a direction in which the first connector 210 is positioned changes.

In FIG. 10C, the area formed by the quadrangular frame of the first connector 210 is positioned horizontally (e.g., parallel or substantially parallel) with the bottom side of the immersion cooler 3, but in FIG. 10D, the area formed by the quadrangular frame of the first connector 210 is positioned horizontally (e.g., parallel or substantially parallel) with the area of the heat dissipation device 1 (e.g., with the heat dissipation device surface 1*a*). This means that the blade portion 120 of the turbine 100 is positioned horizontally with the bottom (e.g., the blade length 120*t* of one or more turbine blades of the blade portion 120 is extending parallel or substantially parallel with the bottom end 3*s* of the immersion cooler 3).

In the drawing, the rotation 240*r* of the second rotator 240 and the rotation 230*r* of the first rotator 230 is shown in FIGS. 10C and 10D, respectively, but a rotation order of the first rotator 230 and the second rotator 240 is not related, and they may be rotated together or in a different order from what is shown in FIGS. 10C and 10D.

As confirmed in FIGS. 10A to 10D, when heat dissipation device 1 is laid horizontally on the bottom end 3*s* and then stands upright, the power generation system 10 according to some example embodiments of the present inventive concepts is configured to, in response, cause the turbine 100 to be realigned such that the blade portion 120 of the turbine 100 is positioned horizontally (e.g., parallel or substantially parallel) with the bottom end 3*s* of the immersion cooler 3, to thereby position the turbine 100 to receive upwards-rising bubbles 2 to thereby be driven by such upwards-rising bubbles 2 to generate electricity, according to the rotation of the first rotator 230 and the second rotator 240.

In addition, in some example embodiments, when the heat dissipation device 1 is positioned to stand vertically (e.g., such that the heat dissipation device surface 1*a* extends parallel or substantially parallel to the direction of gravity) and then lie down horizontally (e.g., such that the heat dissipation device surface 1*a* extends perpendicular or substantially perpendicular to the direction of gravity), as the first rotator 230 and the second rotator 240 rotate, the blade portion 120 of the turbine 100 may be re-aligned horizontally with the bottom end 3*s* in response to maintain the positioning of the turbine 100 to be driven by bubbles 2 rising at least partially in the vertical direction Z from the heat dissipation device 1.

When the blade portion 120 is positioned horizontally with the bottom (e.g., a blade length 120*t* of one or more turbine blades of the blade portion 120 extends parallel or substantially parallel with the bottom end 3*s* of the immersion cooler 3), as the bubbles 2 rising toward the upper side of the immersion cooler 3 move toward the blade portion 120, the blade portion 120 rotates by the action of the rising pressure of the bubbles 2 (e.g., rising pressure on one or more lower surfaces 120*s* of the blade portion 120), and as a result, the turbine 100 is driven.

Figure 11:
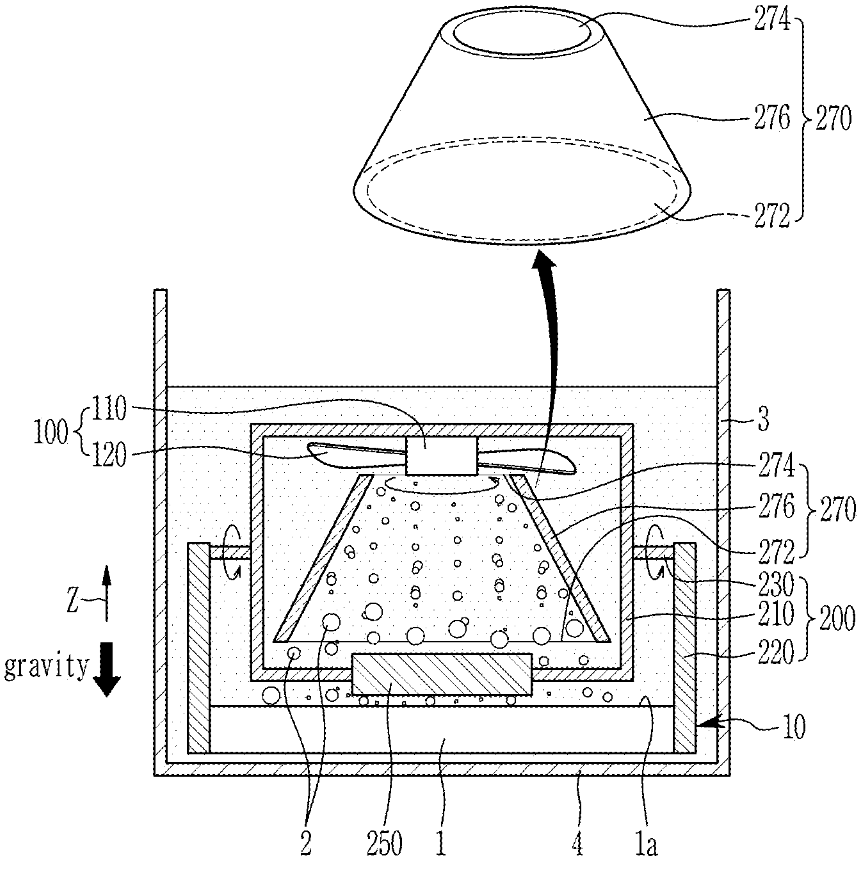
FIG. 11 illustrates a power generation system according to some example embodiments of the present inventive concepts.

FIG. 11 illustrates a diagram for describing the power generation system 10 according to some example embodiments.

According to some example embodiments, including the example embodiments shown in FIG. 11, the power generation system 10 may include a bubble collector 270 that is configured to collect the bubbles 2. The bubble collector 270 may be positioned between a bubble generation area (e.g., heat dissipation device surface 1*a*) where the bubbles 2 are generated and the turbine 100 positioned above the bubble generation area. For example, the bubble collector 270 may be configured to be positioned between the turbine 100 and the heat dissipation device 1. For example, the bubble collector 270 may be configured to collect the bubbles 2 rising at least partially in the vertical direction Z from the heat dissipation device surface 1*a* and the connector 200 may be configured to position the bubble collector 270 at least partially between the heat dissipation device surface 1*a* in the refrigerant 4 and the turbine 100.

As shown in FIG. 11, the bubble collector 270 may include a bubble inlet hole 272 through which the bubbles 2 flow, a bubble discharge hole 274 facing the bubble inlet hole 272 and having a smaller diameter than the bubble inlet hole 272, and a side portion 276 (also referred to herein as a cylindrical side portion, a cylindrical side structure, or the like) extending to surround the bubble inlet hole 272 and the bubble discharge hole 274.

The bubble collector 270 may be configured to collect the bubbles 2, generated in the heat dissipation device 1 and moving upward, in a direction in which the turbine 100 is positioned. For example, the bubble collector 270 may be configured to receive the bubbles 2 rising at least partially in the vertical direction Z from the heat dissipation device surface 1*a* through the bubble inlet hole 272. The bubble discharge hole 274 may be configured to face the bubble inlet hole 272 and may have a smaller diameter than the bubble inlet hole 272; and a cylindrical side portion 276 at least partially defining a conduit extending between the bubble inlet hole 272 and the bubble discharge hole 274.

If there is no bubble collector 270 in the power generation system 10, the bubbles 2 may be dispersed (e.g. dispersed in a direction perpendicular to the vertical direction Z) and rise uniformly or substantially uniformly upward. As such, the rising pressure of the bubbles 2 collected by the bubble collector 270 and heading toward the turbine 100 in the vertical direction Z is higher than that of the bubbles 2 that are uniformly dispersed and headed toward the turbine 100, so a force that rotates the blade portion 120 of the turbine 100 may become stronger. As a result, the bubble collector 270 may be configured to increase the electrical power generation by the turbine 100, and thus the electrical power generated by the power generation system 10, based on increasing the pressure exerted by the bubbles 2 on the blade portion 120 of the turbine 100.

Although not shown in the drawing, the bubble collector 270 may be connected to a portion of the power generation system 10, such as the turbine 100 and the connector 200.

According to some example embodiments of the present inventive concepts, the power generation system 10 may be a power generation system 10 used in a process of cooling the heat dissipation device 1 by immersing it in the refrigerant 4. The above cooling method may also include a liquid immersion cooling method.

The power generation system 10 may include the turbine 100 positioned in the refrigerant 4 in a path along which the bubbles 2 generated during a cooling process of the heat dissipation device 1 move, and the connector 200 connecting the turbine 100 and the heat dissipation device 1 such that the turbine shaft 110 is positioned parallel to the direction of gravity.

The turbine 100 may include the turbine shaft 110 and the blade portion 120 (e.g., a plurality of turbine blades) connected to the turbine shaft 110.

The connector 200 may include a first connector 210 having a first side 210*a* that is connected to the turbine 100, a second connector 220 fixing the first connector 210 to the heat dissipation device 1, and a first rotator 230 capable of rotating 230*r* around a direction perpendicular to the central longitudinal axis 110*x* of the turbine shaft 110.

The first connector 210 connected to the first rotator 230 may rotate together with rotation of the first rotator 230.

As the first rotator 230 rotates 230*r*, the turbine 100 may be positioned above a bubble generation area where the bubbles 2 are generated, and as the bubbles 2 move upward, the turbine 100 may rotate.

The power generation system 10 may further include a converter 300 that converts kinetic energy generated by the rotational movement of the turbine 100 (e.g., rotation of the turbine shaft 110 around the central longitudinal axis 110*x*) into electrical energy.

According to some example embodiments, a weight 250 may be positioned at a second side 210*b* of the first connector 210. In this case, a position of the turbine 100 may be aligned such that the weight 250 moves downward (e.g., in the direction of gravity) and the turbine 100 moves upward (e.g., in the vertical direction Z) by the action of gravity.

Additionally, an air pocket 260 may be positioned at a first side 210*a* of the first connector 210, and in this case, the turbine 100 may move upward (e.g., in the vertical direction Z) by the action of buoyancy.

Although the converter 300 is not shown in FIGS. 2 to 11, the power generation system 10 may further include the converter 300 according to some example embodiments.

Figure 12:
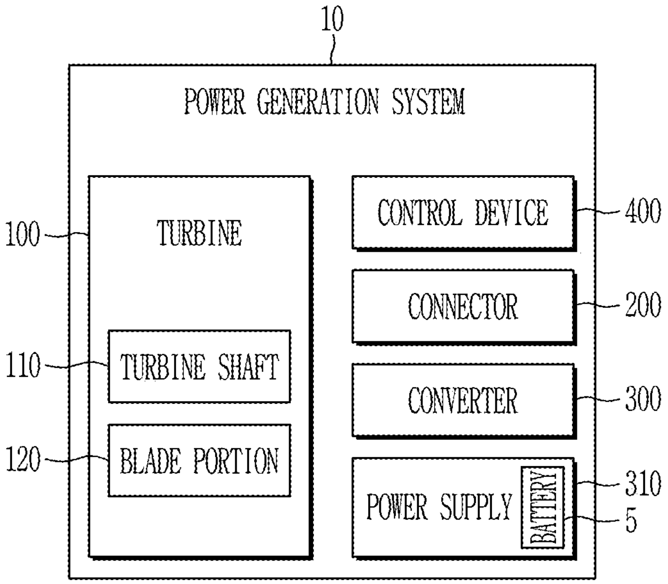
FIG. 12 illustrates a diagram of a power generation system according to some example embodiments of the present inventive concepts.

FIG. 12 illustrates a diagram of a structure of the power generation system 10 according to some example embodiments.

According to FIG. 12, the power generation system 10 according to the present inventive concepts, used in a process of immersion cooling the heat dissipation device 1 in the refrigerant 4 of an immersion cooler 3, may include the turbine 100 positioned in the refrigerant 4 in a path along which the bubbles 2 generated during a cooling process of the heat dissipation device 1 move, and including the turbine shaft 110 and the blade portion 120 connected to the turbine shaft 110, and the connector 200 that connects the turbine 100 and the heat dissipation device 1 to ensure that the turbine shaft 110 (e.g., the central longitudinal axis 110*x* thereof) is positioned parallel or substantially parallel to the direction of gravity.

The power generation system 10 may include the converter 300 that converts kinetic energy of the turbine 100, which rotates by the action of the rising pressure of the bubbles 2, into electrical energy.

The converter 300 may serve to convert kinetic energy into electrical energy. The converter may include an electrical generator.

The power generation system 10 may further include a power supply 310 connected to the converter 300. The power supply 310 may be configured to store electrical energy, including for example electrical energy generated by the converter 300 based on operation of the turbine 100. The power supply 310 may include at least one battery 5 (e.g., at least one rechargeable battery). The power supply 310 may supply stored electrical energy to at least one battery 5.

According to some example embodiments, the electrical energy converted by the converter 300 (e.g., electrical energy generated by the converter 300 based on operation of the turbine 100) may be supplied to the batteries 5 positioned inside or outside a power supply 310, and the electrical energy may be stored in each of the batteries 5.

Use of battery energy generated by the power generation system 10 according to the present inventive concepts is not limited. For example, the power generation system 10 may transmit electrical energy from at least one battery 5 of the power supply 310 to one or more external devices and/or from converter 300 directly to one or more external devices, where such one or more external devices may include the heat dissipating device 1, although example embodiments are not limited thereto.

In some example embodiments, the power generation system 10 may include a control device 400 (e.g., as part of at least one of the turbine 100, the connector 200, the converter 300, or the power supply 310, or as an element separate therefrom) that is electrically coupled to one or more of the turbine 100, the connector 200, the converter 300, or the power supply 310. The control device 400 may be configured to control (e.g., adjust, selectively initiate or inhibit, etc.) a supply of electrical power from the converter 300, the power supply 310 (e.g., one or more batteries 5), or any combination thereof to one or more external devices, including for example the heat dissipation device 1 which may include an electronic device (e.g., a plurality of SSDs, a controller of the SSDs, or any combination thereof).

The control device 400 may include, may be included in, and/or may be implemented by one or more instances of processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a graphics processing unit (GPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), an Image Signal Processor (ISP), and the like. In some example embodiments, the processing circuitry may include a non-transitory computer readable storage device (e.g., a memory), for example a solid state drive (SSD), storing a program of instructions, and a processor (e.g., CPU) configured to execute the program of instructions to implement the functionality and/or methods performed by some or all of any devices, systems, modules, portions, units, controllers, circuits, and/or portions thereof according to any of the example embodiments.

While the inventive concepts have been described in connection with what is presently considered to be practical example embodiments, it is to be understood that the inventive concepts are not limited to such example embodiments. On the contrary, the inventive concepts are intended to cover various modifications and equivalent arrangements included within the spirit and scope of the appended claims.

What is claimed is:

1. A power generation system comprising:

a container with a refrigerant configured to immerse a heat dissipation device, wherein the heat dissipation device is configured to vaporize at least a portion of the refrigerant at a surface of the heat dissipation device and thereby generate bubbles;

a turbine including a turbine shaft rotatable about a central longitudinal axis and a plurality of turbine blades connected to the turbine shaft;

a rotatable connector configured to connect the turbine and the heat dissipation device, position the central longitudinal axis of the turbine shaft to extend parallel to a direction of gravity, and position the turbine in a path of the bubbles rising from the surface of the heat dissipation device in a vertical direction extending parallel and opposite to the direction of gravity, wherein the turbine shaft is configured to rotate about the central longitudinal axis based on an action exerted by the bubbles which impart kinetic energy to the plurality of turbine blades; and a converter configured to convert the imparted kinetic energy into electrical energy.

2. The power generation system of claim 1, wherein the rotatable connector includes:

a first connector having a first portion connected to the turbine;

a second connector configured to fix the first connector to the heat dissipation device and enable the turbine shaft to rotate about the central longitudinal axis; and a first rotator between the first connector and the second connector, the first rotator being configured to rotate at least partially around a first rotation axis of the first rotator, wherein the first rotation axis is perpendicular to the central longitudinal axis of the turbine shaft, and wherein the first connector is configured to rotate at least partially around the first rotation axis together with a rotation of the first rotator.

3. The power generation system of claim 2, wherein the first connector has a quadrangular frame shape.

4. The power generation system of claim 1, wherein the heat dissipation device includes a solid state drive (SSD) storage device.

5. A power generation system comprising:

a container with a refrigerant configured to immerse a heat dissipation device, wherein the heat dissipation device is configured to vaporize at least a portion of the refrigerant at a surface of the heat dissipation device and thereby generate bubbles;

a turbine including a turbine shaft rotatable about a central longitudinal axis and a plurality of turbine blades connected to the turbine shaft; and a rotatable connector configured to connect the turbine and the heat dissipation device, position the central longitudinal axis of the turbine shaft to extend parallel to a direction of gravity, and position the turbine in a path of the bubbles rising from the surface of the heat dissipation device in a vertical direction extending parallel and opposite to the direction of gravity, wherein the turbine shaft is configured to rotate about the central longitudinal axis based on an action exerted by the bubbles which impart kinetic energy to the plurality of turbine blades, and wherein the rotatable connector includes a first connector having a first portion connected to the turbine, a second connector configured to fix the first connector to the heat dissipation device and enable the turbine shaft to rotate about the central longitudinal axis, and a first rotator between the first connector and the second connector, the first rotator being configured to rotate at least partially around a first rotation axis of the first rotator, the first rotation axis being perpendicular to the central longitudinal axis of the turbine shaft.

6. The power generation system of claim 5, further comprising:

a converter configured to convert kinetic energy of the turbine into electrical energy.

7. A power generation system comprising:

a container with a refrigerant configured to immerse a heat dissipation device, wherein the heat dissipation device is configured to vaporize at least a portion of the refrigerant at a surface of the heat dissipation device and thereby generate bubbles;

a turbine, the turbine including a turbine shaft rotatable about a central longitudinal axis and a plurality of turbine blades connected to the turbine shaft, the turbine in the refrigerant in a path of the bubbles rising from the surface of the heat dissipation device in a vertical direction extending parallel and opposite to a direction of gravity, wherein the turbine shaft is configured to rotate about the central longitudinal axis based on an action exerted by the bubbles generated at the surface of the heat dissipation device and rising at least partially in the vertical direction from the surface of the heat dissipation device which impart kinetic energy to the plurality of turbine blades;

a rotatable connector configured to connect the turbine and the heat dissipation device, and to position the central longitudinal axis to extend parallel to the direction of gravity; and a converter configured to convert the imparted kinetic energy into electrical energy.

8. The power generation system of claim 7, further comprising:

a power supply connected to the converter, wherein the power supply is configured to store electrical energy received from the converter and to supply the electrical energy to at least one battery.

* * * * *